United States Patent [19]

Isaka

[11] Patent Number: 5,359,972
[45] Date of Patent: Nov. 1, 1994

[54] TUMBLE CONTROL VALVE FOR INTAKE PORT

[75] Inventor: Yoshiharu Isaka, Iwata, Japan

[73] Assignee: Yamaha Hatsudoki Kabushiki Kasha, Iwati, Japan

[21] Appl. No.: 834,604

[22] Filed: Feb. 12, 1992

[30] Foreign Application Priority Data

| Feb. 21, 1991 | [JP] | Japan | 3-047436 |
| Apr. 8, 1991 | [JP] | Japan | 3-101789 |
| Apr. 15, 1991 | [JP] | Japan | 3-111182 |
| Jun. 28, 1991 | [JP] | Japan | 3-185400 |
| Aug. 5, 1991 | [JP] | Japan | 3-218015 |
| Aug. 30, 1991 | [JP] | Japan | 3-247015 |
| Aug. 30, 1991 | [JP] | Japan | 3-247018 |

[51] Int. Cl.$^5$ .............................................. F02B 31/00
[52] U.S. Cl. ................................................ 123/308
[58] Field of Search ......................... 123/306, 308, 432

[56] References Cited

U.S. PATENT DOCUMENTS

| 4,317,438 | 3/1982 | Yagi et al. | 123/432 |
| 4,320,725 | 3/1982 | Rychlik | 123/188 M |
| 4,499,868 | 2/1985 | Kanda et al. | 123/306 |
| 4,663,938 | 5/1987 | Colgate | 123/308 |
| 4,669,434 | 6/1987 | Okumura | 123/306 |
| 4,719,886 | 1/1988 | Kotani et al. | 123/308 |
| 4,753,200 | 6/1988 | Kawamura et al. | 123/306 |
| 4,762,102 | 8/1988 | Kanda | 123/306 |
| 4,827,883 | 5/1989 | Khalighi et al. | 123/308 |
| 4,834,035 | 5/1989 | Shimada et al. | 123/308 |
| 4,974,566 | 12/1990 | Lo Russo et al. | 123/432 |
| 4,998,518 | 3/1991 | Mitsumoto | 123/306 |

FOREIGN PATENT DOCUMENTS

| 054964A1 | 6/1982 | European Pat. Off. . |
| 06841A1 | 1/1983 | European Pat. Off. . |
| 235288A1 | 9/1987 | European Pat. Off. . |
| 3429414 | 2/1985 | Germany . |
| 3638021 | 5/1987 | Germany . |
| 51-544007 | 12/1976 | Japan . |
| 56-43428 | 4/1981 | Japan . |
| 56-139829 | 10/1981 | Japan . |
| 59-5767 | 2/1984 | Japan . |
| 60-11206 | 3/1985 | Japan . |
| 61-12940 | 1/1986 | Japan . |
| 61-144223 | 9/1986 | Japan . |
| 63-32122 | 2/1988 | Japan . |
| 63-73532 | 5/1988 | Japan . |
| 63-73534 | 5/1988 | Japan . |
| 2115922 | 9/1990 | Japan . |
| 2230920 | 9/1990 | Japan . |
| 2242226 | 9/1991 | United Kingdom | 123/306 |

OTHER PUBLICATIONS

European Search Report, Patent Abstracts of Japan vol. 10, No. 176 (M-491) (2232) 20 Jul. 1986 & JP-A-61 25 916 (Mazda Motor Corp) 5 Feb. 1986 *abstract*

Primary Examiner—Tony M. Argenbright
Assistant Examiner—Erick Solis
Attorney, Agent, or Firm—Knobbe, Martens, Olson & Bear

[57] ABSTRACT

A number of embodiments of induction systems for internal combustion engines wherein a control valve arrangement is provided in the induction passage for selectively generating either or both of tumble and/or swirl to the intake charge in response to varying running conditions. Various types of control valve arrangements are disclosed as are systems for cooling the control valves and augmenting the flow pattern caused by the control valve.

62 Claims, 30 Drawing Sheets

TUMBLE CONTROL VALVE FOR INTAKE PORT

BACKGROUND OF THE INVENTION

This invention relates to an induction system for an internal combustion engine and more particularly to a tumble control valve for the intake port of an internal combustion engine.

As is well known, most internal combustion engines are called upon, in their application, to operate over widely varying speed and load ranges. This is particularly true in connection with vehicular applications such as automobiles and motorcycles. As is also well known, because of this speed and load variation over which the engine is operated, there are many compromises in the design of the engine. This is particularly true in the area of the induction system.

It has been well known that combustion at low engine speeds and low engine loads can be significantly improved with attendant improvements in fuel economy and exhaust emission control if a high degree of turbulence is induced into the intake charge and in the combustion chamber. However, all turbulence increasing devices in the induction system tend to offer some flow resistance. Therefore, the use of turbulence increasing devices in the induction system reduces the maximum power output of the engine. Thus, most induction systems are designed as compromise between good low speed performance and good high speed performance.

One form of turbulence which is generated in the combustion chamber is characterized as "swirl". Swirl is a flow of the charge in the combustion chamber in a generally circumferential direction around the axis of the cylinder. Swirl is generally generated by use of swirl ports in the induction system. However, the generation of swirl can reduce the volumetric efficiency at high speed. This is because swirl ports have higher flow resistance than non-swirl ports. In addition, there are some phases of running of the engine when swirl is not desirable even though some form of motion of the charge in the chamber is desirable.

Another form of motion in the combustion chamber is called "tumble". Tumble is a swirling motion of the intake charge about an axis that generally extends transversely to the cylinder bore axis. With such a flow arrangement, the charge tends to flow across the cylinder head, down one side of the cylinder bore, back across the cylinder bore across the top of the head of the piston and then up the other side of the cylinder bore back to the cylinder head with this flow pattern repeating. This type of motion also requires the formation of a specially formed port which will provide flow resistance and reduce volumetric efficiency under high speed. Like swirl, tumble is more effective at some speed than other speeds.

Of course, even more turbulence may be generated in the intake charge if both swirl and tumble can be generated at the same time. However, generating both such motions through a single port configuration can further increase the flow resistance and reduce high speed performance.

It is, therefore, a principal object of this invention to provide and improved induction port system that will permit selective increase in turbulence in the combustion chamber under some running conditions and different flow patterns under other running conditions.

It is a further object of this invention to provide an arrangement for the induction system of internal combustion engines which permits the generation of both swirl and tumble.

It is a further object of this invention to provide an induction system for an internal combustion engine wherein swirl and tumble can be generated under some running conditions but avoided under other running conditions.

It is yet another object of the invention to provide an arrangement for the induction system of an engine which permits the generation of swirl and/or tumble, depending upon the running conditions.

One way in which the flow pattern in the combustion chamber can be varied under varying speed and load conditions is to provide a control valve in the induction passage that changes the effective configuration of the induction passage as the control valve is moved. The control valve can then be moved in response to varying speed and load conditions so as to provide the desired flow pattern. Such arrangements, however, as previously proposed have only permitted the establishment of either one type of swirling motion (either swirl or tumble) or substantially no turbulence.

It is, therefore, a further object of this invention to provide a single control valve arrangement that permits the generation of either swirl and/or tumble in the induction system and combustion chamber.

One technique for changing the flow pattern from an intake passage in an internal combustion engine employs an additional passage that intersects the main intake passage upstream of the valve seat and through which another higher velocity flow is established. However, like other flow altering devices, there are some running conditions when it is not desirable to have this small port be effective. This can be done through the provision of a control valve but if another control valve is also employed for changing the effective configuration of the port, then the engine becomes very complicated. Furthermore, it may be physically impossible to employ two such valves in the cylinder head of an engine, where the intake port is normally formed.

It is, therefore, a still further object of this invention to provide an improved control valve arrangement for an engine induction system wherein the flow through two ports terminating at a common valve seat may be controlled by a single valve element to alter the flow relationship of the charge entering the combustion chamber.

As has been noted, one way in which the flow patten within a combustion chamber may be altered is by providing a control valve that operates in the intake passage of the engine. However, where such a control valve is provided, even when the control valve is in a wide open position, some obstruction to the flow through the intake passage may occur. This can be either by direct flow resistance of the valve or a mounting portion of it extending into the induction passage even when the valve is fully opened. In addition, the control valve in its fully open position or some portion associated with it can give rise to a less than smooth intake passage which will induce turbulence within the intake passage itself and, accordingly, adversely effect volumetric efficiency.

It is, therefore, a still further object of this invention to provide an improved intake passage and control valve arrangement therefore wherein the effective cross sectional area of the intake passage may be changed but in its fully open position the control valve does not interfere in any way with the smooth transition of flow through the intake passage.

It is a further object of this invention to provide an improved intake passage and control valve arrangement for an internal combustion engine.

In connection with the control of the flow pattern of an intake charge into the combustion chamber from an intake port, there may some advantages in utilizing a rectifier plate in the intake port upstream of the valve seat so as to direct the flow. In addition, a control valve may be employed in conjunction with such a rectifier plate so as to not only control and direct the flow but change the velocity and direction.

It is, therefore, a still further object of this invention to provide an improved intake port and rectifier structure.

In connection with the use of such a rectifier plate in the intake passage, there is also a problem in actually forming such a plate in the cylinder head. If an attempt is made to cast the port directly into the cylinder head, this can greatly complicate the casting process and, in fact, may cause other problems. If a separate insert is employed, however, then there is a risk that the insert may become displaced, particularly during running of the engine.

It is, therefore, a still further object of this invention to provide an improved valve seat and rectifier plate formed as a unitary assembly.

In connection with the use of a control valve for controlling and altering the flow through an intake port, the control valve can be subject to heating during operation of the engine. If there are too large a temperature gradient created between the control valve and the supporting portion of the cylinder head, binding in the control valve operation may result.

It is, therefore, another still further object of this invention to provide an improved arrangement for cooling the control valve of an engine induction system.

It is a further object of this invention to provide an improved cooling arrangement for an intake port control valve that is mounted for rotation in the cylinder head of an engine.

There are a number of advantages to employing rotary control valves for the intake passage of an internal combustion engine. Where the engine has overhead valves, it is also desirable to have the rotational axis for the control valve extend transversely to the intake passage, and if multiple cylinders are employed, to extend along the length of the engine so all intake passages can be controlled by a single valve assembly. However, when this is done, the added components to the cylinder can present problems in connection with placement and operation.

It is, therefore, a still further object of this invention to provide an improved arrangement for affixing a cylinder head and cylinder block together and locating a control valve for the intake passages of the engine without interference from the fasteners.

The problems in placement of the control valves in the cylinder head are further magnified if the engine employs twin overhead camshafts, as is typical with high performance engines. That is, with normal camshaft placements the addition of a control valve for the intake port and the fastening arrangements can give rise to some problems.

It is a further object of this invention, therefore, to provide an improved control valve layout for the intake ports of a twin overhead camshaft internal combustion engine.

SUMMARY OF THE INVENTION

The first feature of this invention is adapted to be embodied in a porting arrangement for an internal combustion engine having a cylinder, a piston reciprocating within the cylinder and a cylinder head affixed to the cylinder. An inlet port is provided for admitting a charge into the cylinder and means cooperate with the inlet port for selectively generating a circular swirl to a charge entering the cylinder from the inlet port and a tumble to the charge around the cylinder between the cylinder head and the head of the piston.

Another feature of the invention is adapted to be embodied in a cylinder head and valve arrangement for an internal combustion engine that comprises a pair of inlet passages extending through the cylinder head and terminating at a pair of adjacent intake ports both serving the cylinder. A single control valve is journaled in the cylinder head contiguous to the inlet passages and is moveable between a first position wherein the flow through passages is substantially unrestricted and a second position extending into respective ones of the intake passages for redirecting the flow there through. The first and second and valve positions are effective to divert the flow through the respective inlet passages in different directions to establish predetermined flow patterns within the cylinder when the control valve is in its second position which is different from the flow pattern when the control is in first position.

Another feature of the invention is adapted to be embodied in a porting arrangement for an internal combustion engine having a cylinder, a piston reciprocating within the cylinder and a cylinder head fixed to the cylinder. An inlet port is provided for admitting a charge into the cylinder and means cooperate with the inlet port for selectively generating either a circular swirl to a charge entering the cylinder from the inlet port or a tumble motion of the charge around the cylinder between the cylinder head and the head of the piston.

Another feature of the invention is adapted to be embodied in a cylinder head and valve arrangement for an internal combustion engine having a pair of inlet passages extending through the cylinder head and terminating at a common intake port. A single control valve is supported by the cylinder head for movement between first and second positions and in which positions the flow through both of the inlet passages is controlled.

A further feature of the invention is adapted to be embodied in a cylinder head arrangement for an internal combustion engine that comprises a recess formed in one surface of the cylinder head and which is adapted to form at least in part a combustion chamber. A valve seat is formed in the recess and a passage extends from the valve seat through the cylinder head and terminates in a port opening in another surface of the cylinder head. The passage is formed by angularly related first and second portions meeting at a bight. A valve element is supported by the cylinder head for rotation about an axis that extends generally transversely to the direction of flow through the passage between the first and second portions. The valve element is moveable between a first position in which it forms a smooth merger between the first and second portions at the bight and offers no significant flow restriction and a second position extending into the passage at the bight and redirecting the flow through the passage.

A still further feature of the invention is adapted to be embodied in a cylinder head arrangement for an internal combustion engine that comprises a passage extending from an opening in one surface area to a valve seat formed in another surface area of the cylinder head. A rectifier plate extends into the passage adjacent the valve seat and defines two separate flow paths within the passage. Valve means are provided in the passage and are moveable between a first position providing substantially unrestricted flow through both of said flow passages and a second position for restricting the flow through at least one of the flow passages.

A still further feature of the invention is adapted to be embodied in a valve seat that is adapted to be pressed into a bore formed in the cylinder head and which is formed at one end of a passage. The valve seat is formed with an integral restricter plate that extends into the passage and divides it into two flow paths adjacent the valve seat.

Yet another feature of the invention is adapted to be embodied in an internal combustion engine that has means that define a combustion chamber and a flow passage which extends through a body of the engine for communicating the combustion chamber with the atmosphere. A control valve is supported for movement within the body across one side of the flow passage for changing the effective shape of the flow passage. Means form a cooling jacket in the body around the control valve for cooling the control valve.

A further feature of the invention is adapted to be embodied in an internal combustion engine having a cylinder block having at least one cylinder bore and a cylinder head. First threaded fastening means are positioned on one side of the cylinder bore for affixing the cylinder head to the cylinder block for closing the cylinder bore. Second threaded fastening means are provided on the other side of the cylinder bore for also affixing the cylinder head to the cylinder block to close the cylinder bore. A flow passage extends through the cylinder head from the cylinder bore on the one side of the cylinder bore to the atmosphere. A control valve is supported within the cylinder head on the one side of the cylinder bore for controlling the effective area of the flow passage. The control valve is positioned between the first and second threaded fastening means.

Another feature of the invention is also adapted to be embodied in an internal combustion engine having a cylinder block having a cylinder bore and a cylinder head affixed to the cylinder block and defining a combustion chamber. An intake passage extends through one side of said cylinder head and terminates at the combustion chamber and an exhaust passage extends through the other side of the cylinder head and terminates at the combustion chamber. Intake and exhaust valves control, respectively, the flow through the intake and exhaust passages. An intake camshaft is journaled by the cylinder head at one side thereof and an exhaust camshaft is journaled by the cylinder head at the other side thereof for operating the intake and exhaust valves, respectively. A control valve extends parallel to the axis of rotation of the intake and exhaust camshafts and is effective for controlling the effective configuration of one of the passages. The camshaft that operates the valve associated with that passages is disposed further from the cylinder bore axis than the other camshaft.

DETAILED DESCRIPTION OF THE PREFERRED EMBODIMENTS OF THE INVENTION

Figure 1:
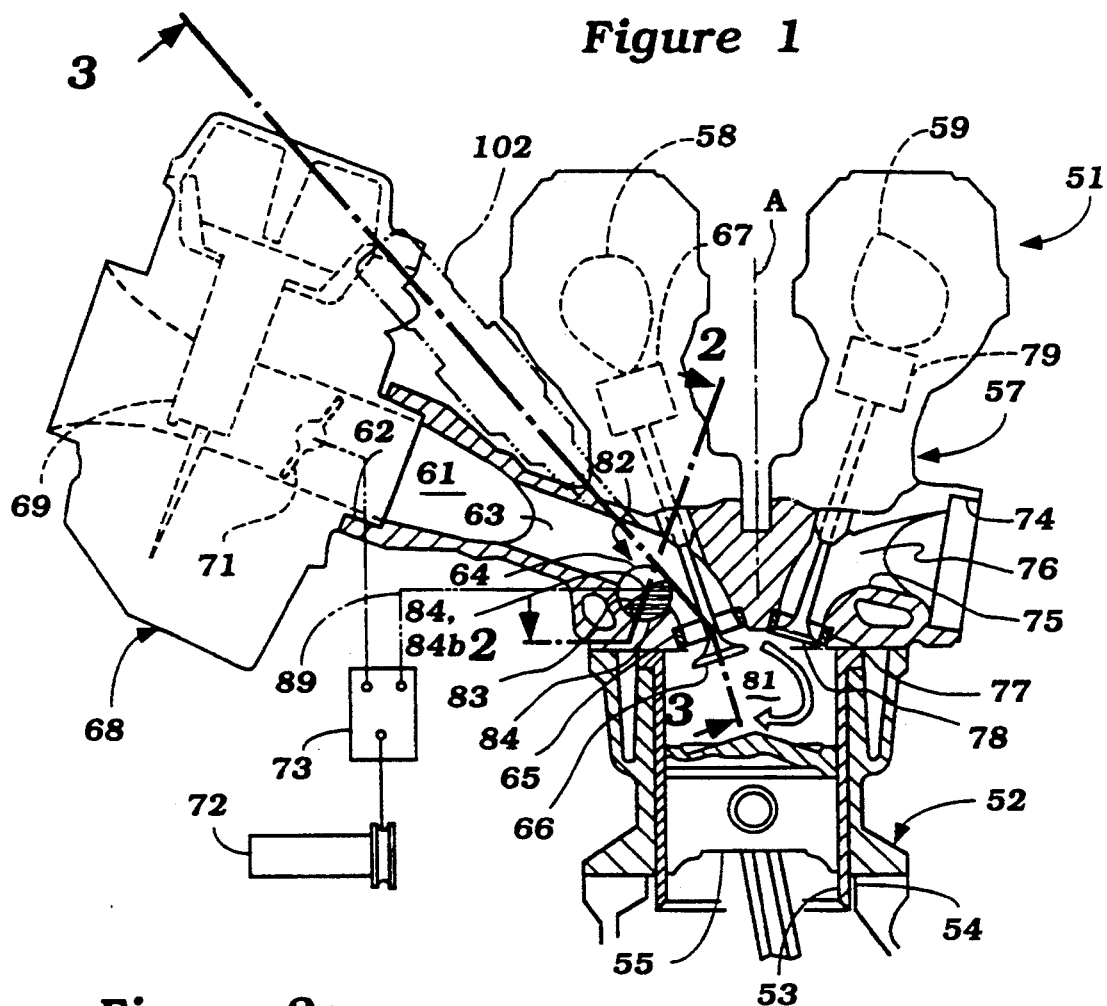
FIG. 1 is an end elevational view of an internal combustion engine constructed in accordance with an embodiment of this invention with portions broken away and shown in cross section and certain portions of the engine eliminated and certain of its controls shown schematically.
Figure 2:
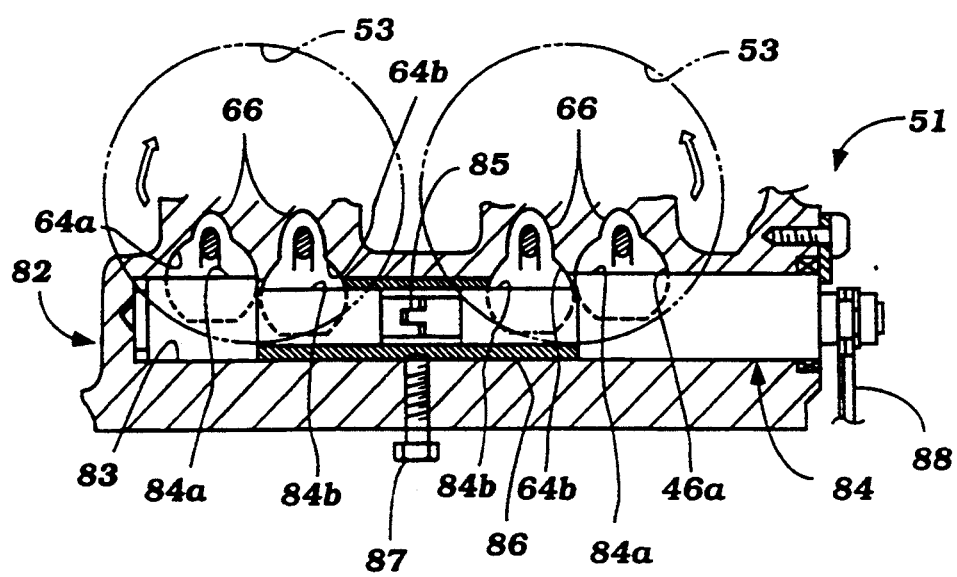
FIG. 2 is an enlarged cross sectional view taken along the line 2—2 of FIG. 1 and shows the control valve construction.

Referring now in detail to the drawings and initially to the embodiments of FIGS. 1 and 2, and internal combustion engine constructed in accordance with this embodiment is identified generally by the reference numeral 51. In this embodiment, like the other embodiments to be described, the engine 51 is of the four cylinder, inline, twin overhead camshaft 4 valve per cylinder type. Although the invention is described in conjunction with an engine having this configuration, it should be readily apparent to those skilled in the art how the invention can be practiced with engines of other configurations. Also since the invention deals primarily with induction system and the air flow pattern created within the combustion chambers, only the upper portion of the engine has been depicted and, in most instances, only a single cylinder of the engine is shown. It is believed that those skilled in the art will understand how the invention can be practiced with complete engines and engines of other cylinder numbers and types, as aforementioned.

The engine 51 includes a cylinder block, indicated generally by the reference numeral 52 that has aligned cylinder bores 53 formed by pressed or cast in cylinder liners 54. Pistons 55 reciprocate in the cylinder bores 53 and are connected to a crankshaft (not shown) by means of connecting rods 56 in a well known manner.

A cylinder head assembly, indicated generally by the reference numeral 57 is affixed to the cylinder block 52 in a suitable manner and rotatably journals a pair of camshafts 58 and 59 which are driven at half speed from the crankshaft in any well known manner. In certain embodiments of this invention, as will become apparent, the engine 51 is divided into two separate paired cylinder block portions that are separated by the drive for the camshafts 58 and 59. Of course, and as will be described later, the camshafts 58 and 59 may be driven off one end of the engine if desired.

A siamesed type of intake passage, indicated generally by the reference numeral 61 extends through one side of the cylinder head 57 from an intake port 62 and then is divided by an internal wall 63 into a pair of passages 64a and 64b that terminate at individual valve seats 65a and 65b the flow through which is controlled by a respective intake valve 66 that is directly actuated by the intake camshaft 58 via thimble tappets 67. In this embodiment, a charge former in the form of a carburetor 68 is provided for supplying a charge to each of the intake ports 61. The charge former 68 is of the air valve type and includes a diaphragm biased piston valve 69 which is positioned upstream of a manually operated throttle valve 71. The throttle valve 71 is operated by a throttle control 72 that is connected to the throttle valve 71 through a connecting assembly 73 which will be described in more detail later.

An exhaust port 74 is formed in the other side of the cylinder head 57 and is divided into a pair of exhaust passages 75 by a dividing wall 76. Valve seats 77 at the base of the passages 75 cooperate with exhaust valves 78. The exhaust valves 78 are operated directly by the exhaust camshaft 59 through thimble tappets 79.

There is further mounted a spark plug (not shown in this embodiment) in the cylinder head 57 centrally of an axis A which is aligned with the axis of the cylinder bore 53 for firing the charge in the chamber. The combustion chamber is indicated generally by the reference numeral 81 and the engine layout is such that the spark plug is disposed centrally between the heads of the intake and exhaust valves 66 and 77, respectively.

The intake passages 64a and 64b are configured so that they are substantially parallel to each other and are comprised of first and second angularly related portions that are merged at a bight. One section, that leading from the port opening 62, extends generally horizontally although it is inclined somewhat downwardly while the other portion, which terminates at the valve seat 65, extends generally parallel to the axis of the cylinder bore (A) and hence the charge issuing from the intake passages 64a and 64b will generally flow along the axis of the cylinder bore (A) and will effect little turbulence in the intake charge. This will provide extremely good volumetric efficiency.

However, it is desirable to provide a high degree of turbulence to the intake charge, particularly at low and mid range performance so as to insure rapid flame travel in the combustion chamber and complete combustion. To this end, there is provided a control valve, indicated generally by the reference 82 which is disposed at the bight of the intake passage portions and which will redirect the flow in such a manner as to create turbulence in the combustion chamber. This turbulence is created by generating both a swirl around the axis of the cylinder bore (A) and also a tumble that will cause the air to flow from the valve seat 65 toward the opposing wall of the cylinder bore 53, be there deflected downwardly across the head of the piston 55 back toward the cylinder bore wall adjacent the valve seat 65 and then upwardly and back across the cylinder head 57 in the manner as previously described. The arrow in FIG. 1 indicates this tumble motion.

The control valve 42 is formed in part by means of a bore 83 that extends transversely across the cylinder head 57 perpendicular to the cylinder bore axis (A) and at the lower side of the bight between the intake passage portions forming the passages 64a and 64b. A control valve member, indicated generally by the reference numeral 84 is supported in this bore 83 in a manner which will be described. The control valve 84 is made up of two segments each of which has a large diameter portion with a cut out 84a and a small diameter portion with a cut out 84b. These sections are connected together for common rotation by a tongue and groove or keyed connection 85. The bore 83 is a blind bore for the two cylinders at each of the engine and it may be seen how the valve parts are easily inserted. They are held in position axially by means of a locating sleeve 86 which is held in position by a set screw 87. An actuating lever 88 is affixed to the exposed end of each valve shaft 84 and is connected by means of a wire transmitter 89 to the connecting assembly 73 so as to be operated in a sequence with the throttle valve 71. The control valve 82 and specifically the element 84 is moveable between two positions. The first of which is shown in the two figures and in this figure the control valve cut outs 84a and 84b partially obscure the intake passages 64a and 64b on their lower side so as to direct the charge flowing there through to the opposite side of the valve seat 65 so that the charge will tend to enter the combustion chamber in a direction flowing toward the opposing surface of the cylinder bore 53, as aforenoted. Also, because the cut out portions 84a and 84b have a different diameter they will obstruct different portions of the valve port 64a and 64b as clearly shown in FIG. 2. This will create a swirl to the intake charge in the direction shown by the arrows in FIG. 2. Hence, when the valve portions 84a and 84b are in the position shown in FIGS. 1 and 2, great turbulence will be added to the intake charge due to its swirl and tumble motion, as aforedescribed. The control valve 82 is held in this position when the throttle valve 71 are at their idle position and as the opening of the throttle increases, the control valve 82 and specifically its element 84 will be opened. The motion is such that the control valve 84 is opened fully long prior to the full opening of the throttle valve 71. One timing relationship in which this may be done will be described later by reference to another embodiment.

When the control valve 82 is in its fully opened position, the surfaces of the control valve will be clear of the intake passages 64a and 64b and there will be no obstruction to air flow and good volumetric efficiency will result. When the valve element 84 is in its fully opened position, the cut out portions 84a and 84b will provide a smooth surface across the bight connecting the intake valve portions 64a and 64b so that there will be no obstruction to the flow when the valve element 84 is in this position.

Figure 3:
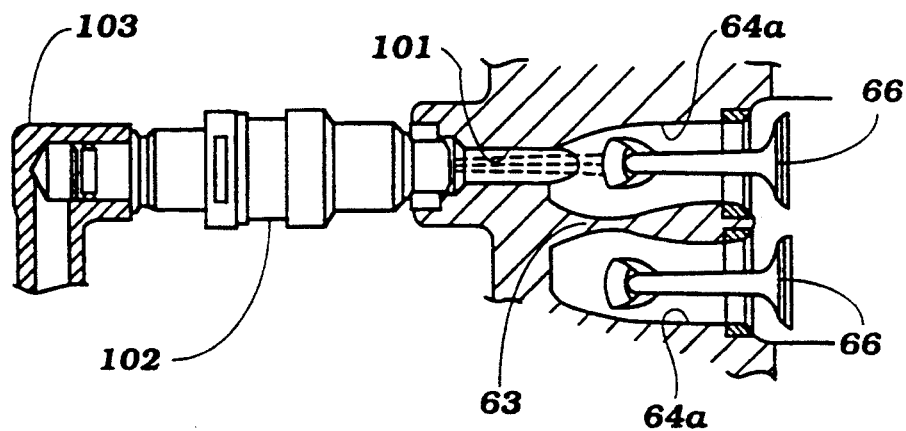
FIG. 3 is an enlarged cross sectional view taken along the line 3—3 of FIG. 1 but shows another embodiment.

In the embodiment of FIGS. 1 and 2, the fuel air charge was supplied to the intake passages 64 by carburetors 68. The invention may, however, also be used in conjunction with fuel injected engines and FIG. 3 shows such an embodiment in conjunction with a port injected system. Because this embodiment differs only from the previously described embodiment in the form of the charge former, only a partial view of the engine is necessary to understand the construction and operation of this embodiment and components in this embodiment which are the same as those already described have been identified by the same reference numerals and will be described again only in so far as is necessary to understand the construction and operation of this embodiment.

In this embodiment, the cylinder head 57 is provided with a port 101 which intersects one of the intake passage portions, the portion 64a in this embodiment, and a fuel injector, of any known type, indicated by the reference numeral 102 is mounted in the cylinder head and sprays through the port 101 into the intake passage 64a. Fuel is supplied to the injector 102 from a manifold 103. It should be noted that the location of the injector 102 is also shown in phantom in FIG. 1 for reference purposes.

Since the injector 102 sprays into the port 64a, which has the greater velocity when the control valve 82 is in its closed position, there will be good disbursion of the fuel in the combustion chamber and good combustion.

Figure 4:
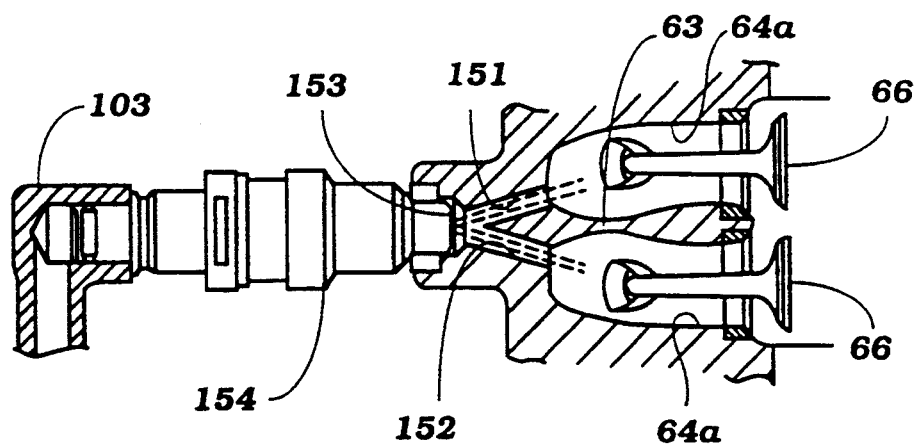
FIG. 4 is a cross sectional view, in part similar to FIG. 3, and shows another embodiment of the invention.

FIG. 4 shows another embodiment of fuel injected engines. In this embodiment, the cylinder head 57 is formed with a pair of injection ports 151 and 152 which extend from a common opening 153 and terminate in the intake passages 64a and 64b, respectively. A single fuel injector 154 sprays into the opening 153 and through the ports 151 and 152 to the respective intake passages 64a and 64b. The fuel manifold 103 supplies fuel to the injectors 154. As a further embodiment, there may be supplied separate fuel injectors one for each of the intake passages 64a and 64b.

Figure 5:
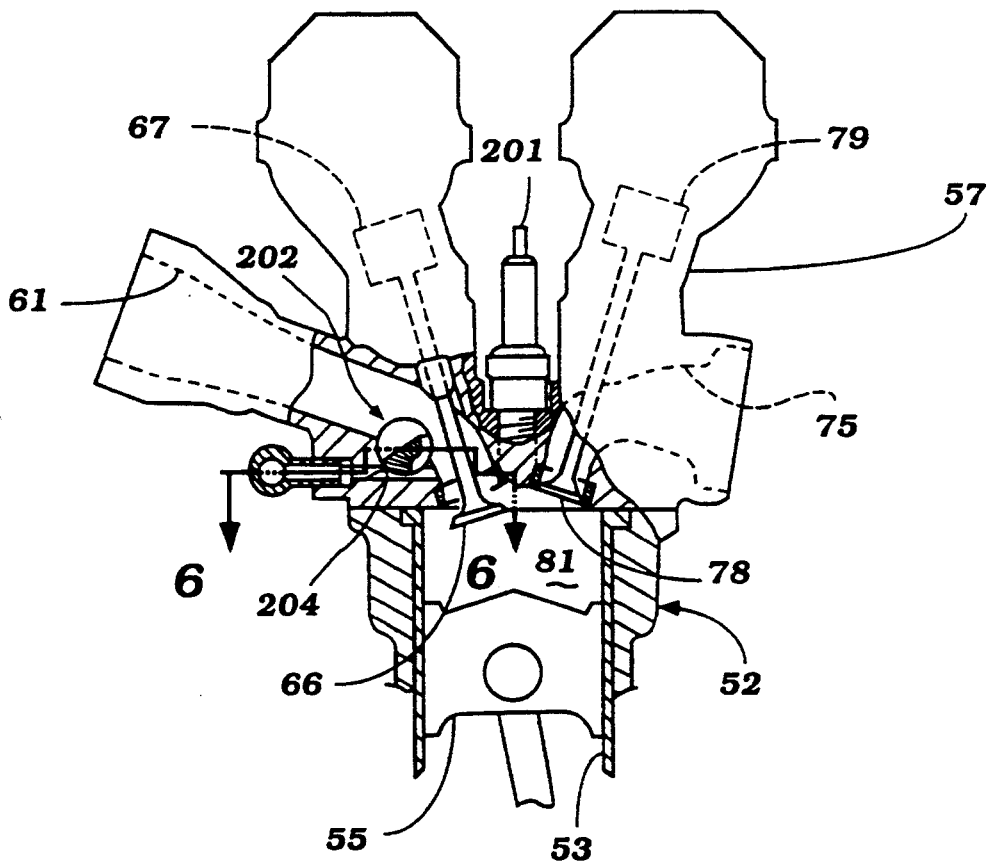
FIG. 5 is a view similar to FIG. 1 and shows yet another embodiment of the invention.
Figure 6:
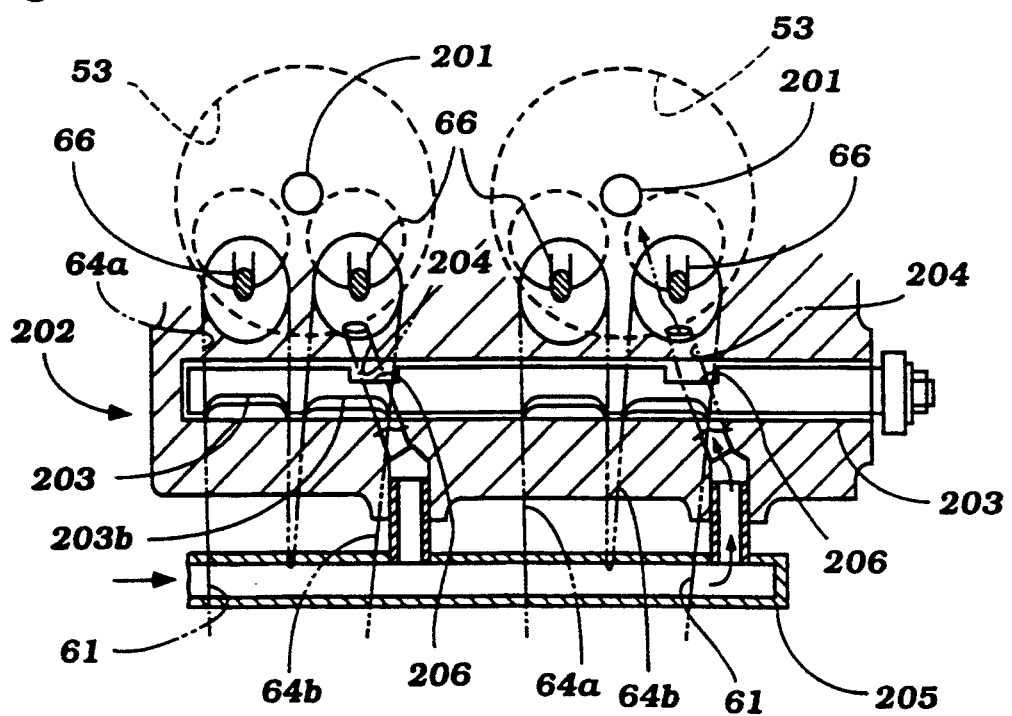
FIG. 6 is a cross sectional view taken along the line 6—6 of FIG. 5.

In the embodiments of the invention as thus far described, the control valve arrangement 82 has been effective so as to generate both swirl and tumble at the same time. In some instances, it may be desirable to provide swirl predominately at one condition and tumble predominately at another condition and FIGS. 5 and 6 show one embodiment as to how this may be accomplished. Since the construction of the basic engine is the same as the previously described embodiments, those components which are the same or substantially the same have been identified by the same reference numerals. In this embodiment, however, the spark plug which did not appear in the previous embodiments, is illustrated and is identified generally by the reference numeral 201.

In this embodiment, the control valve is indicated generally by the reference numeral 202 and includes a valve element 203 which, unlike the previously described embodiment, has equal size and configured cut outs 203a and 203b which cooperate with the intake passages 64a and 64b respectively. When the control valve 203 is in its first or restricting position, a tumble will be generated to the charge entering the combustion chamber 81. However, when the control valve 203 is in its second open position, there will be substantially no turbulence generated through the action of the control valve 203.

However, there are provided a pair of swirl ports 204 which extend through the cylinder head and which terminate in the passages 64b and are angled so as to generate a strong swirling motion if a charge is introduced to them, A manifold 205 interconnects all of the swirl passages 204 of all cylinders with each other. Hence, when one cylinder is experiencing an intake stroke and the intake valve 66 is opened, atmospheric higher pressure air will be delivered through the swirl port 204 from the other intake passages, which are not on an intake cycle, and the strong air velocity will not be encountered and swirl will be generated. The swirl ports 204 are opened and closed by respective second cut outs 206 formed on the control valve 203 and are configured, as shown in the figures, so as to open the swirl ports 204 when the cut outs 203a and 203b effectively open the main intake passages 64a and 64b. Hence, when tumble is being generated there will be no swirl and vice versa.

Although this embodiment provides tumble under one condition and swirl under another condition with an intermediate phase in which both are created, it should be understood that the arrangement of the cut outs 203a, 203b and 206 may be such as to provide swirl and tumble in varying degrees and varying proportions depending upon what the designer desires.

Figure 7:
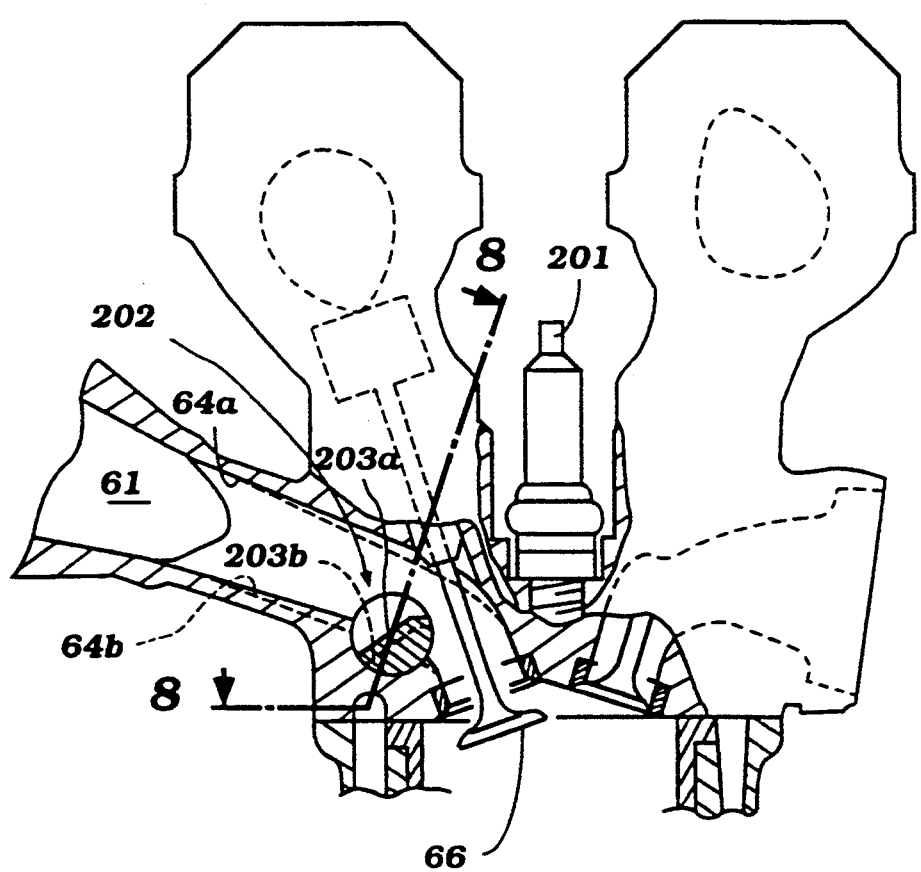
FIG. 7 is an enlarged view, in part similar to FIGS. 1 and 5, and shows another embodiment of the invention.
Figure 8:
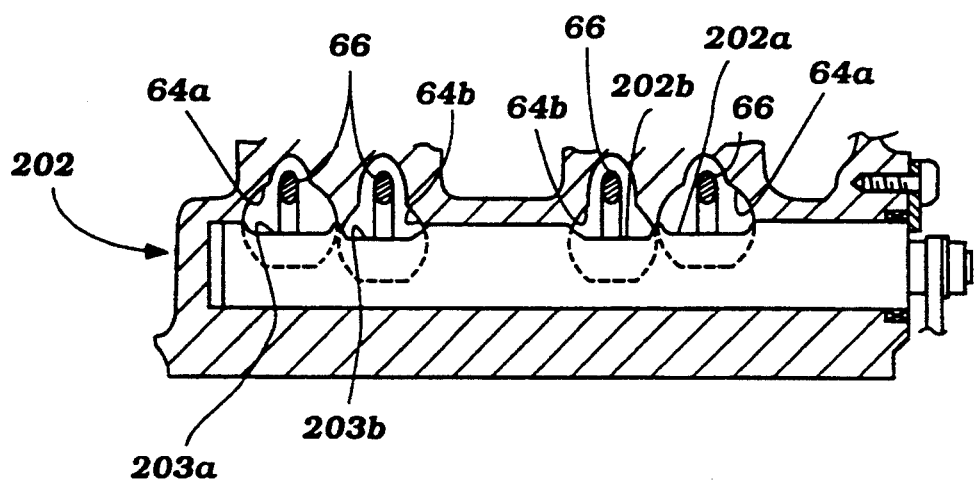
FIG. 8 is a cross sectional view taken along the line 8—8 of FIG. 7 and shows the control valve of this embodiment in its first position.
Figure 9:
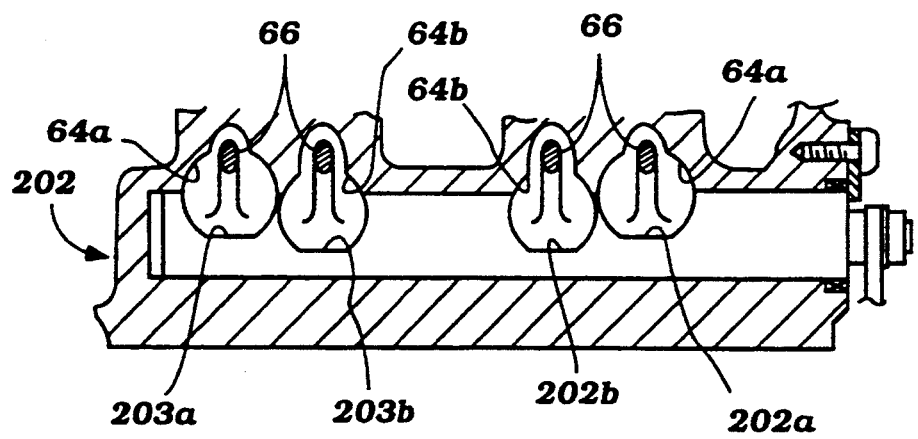
FIG. 9 is a cross sectional view, in part similar to FIG. 8, and shows the control valve in its fully opened position.

In all of the embodiments as thus far described, the intake passages 64a and 64b have been disposed parallel to each other. FIGS. 7 through 9 show another embodiment of the invention which is generally the same as the embodiments of FIGS. 5 and 6 in that a single control valve element is employed but the swirl ports 204 are deleted. As may be clearly seen in the figures, the port 64a has a portion adjacent the control valve 202 which is higher than the passage 64b. As a result, if the cut outs that restrict the flow are of parallel configuration as shown in FIG. 8, the different flow passage positions of the intake passages 64a and 64b will provide the different flow areas to achieve the swirl and tumble action when the control valve 202 is in this position. When the control valve 202 is in its fully open position as shown in FIG. 9, no swirl or tumble action will be generated. Since the components are the same except for their configuration, the reference numerals of FIGS. 5 and 6 have been applied to this embodiment.

Figure 10:
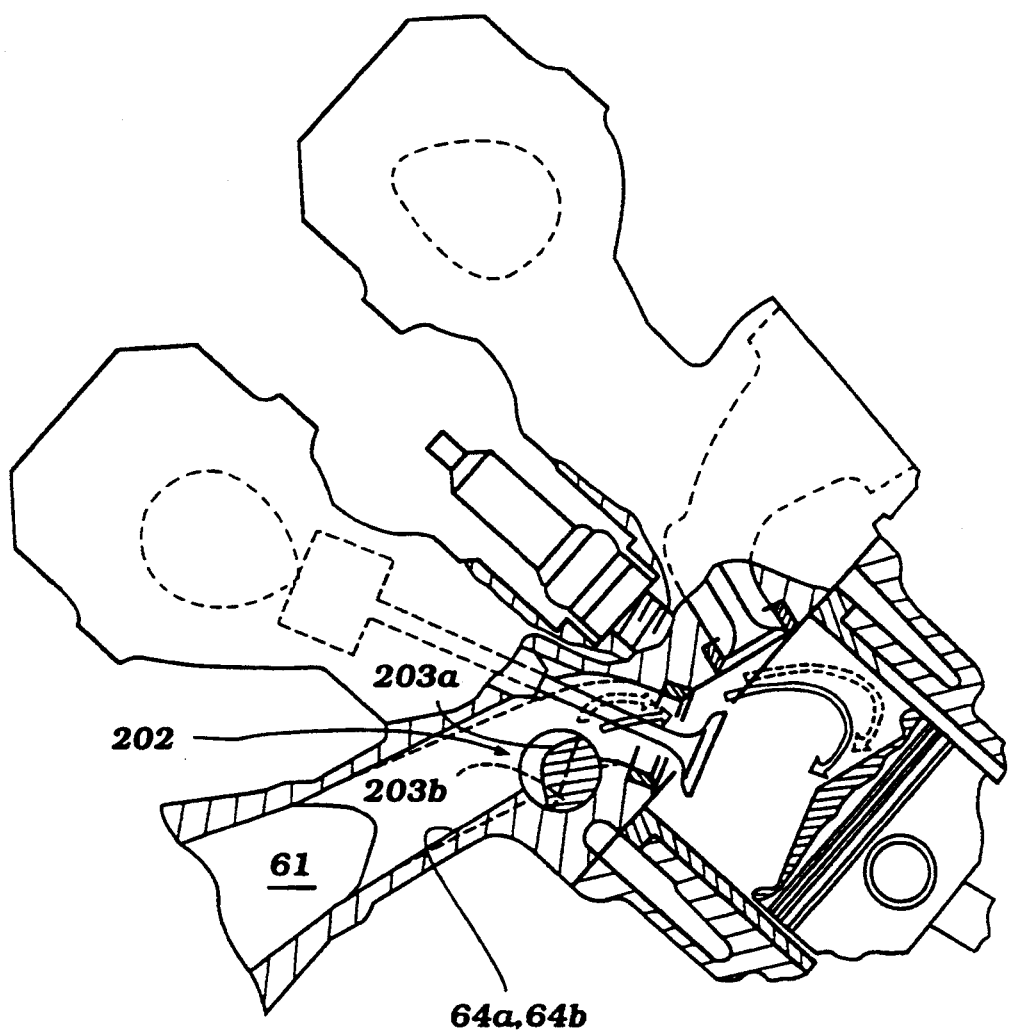
FIG. 10 is a view, in part similar to FIGS. 1, 5 and 7 and shows another embodiment of the invention with the control valve in its first position.
Figure 11:
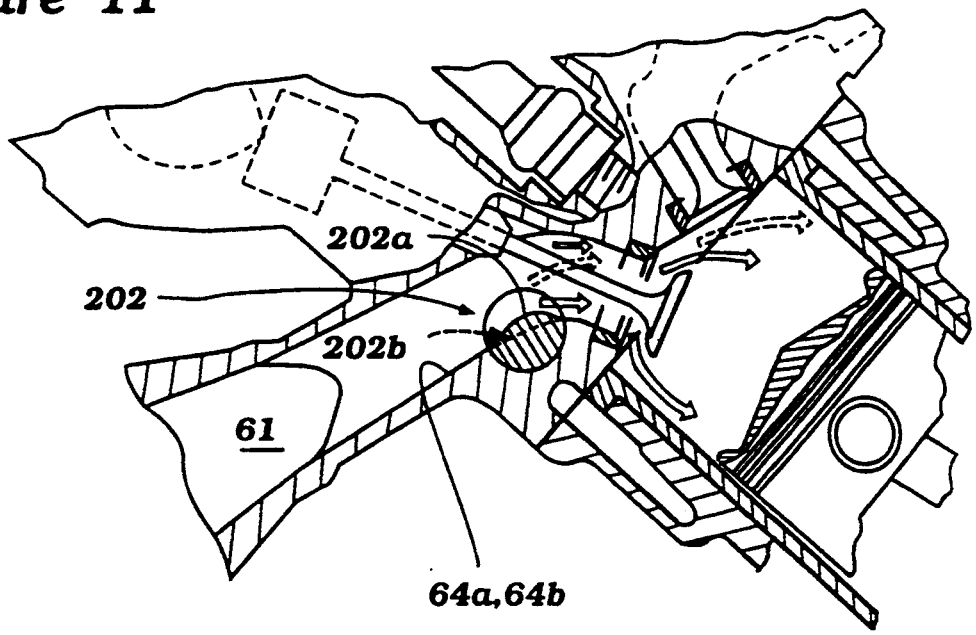
FIG. 11 is a view in part similar to FIG. 10 and shows the control valve in its second opened position.
Figure 12:
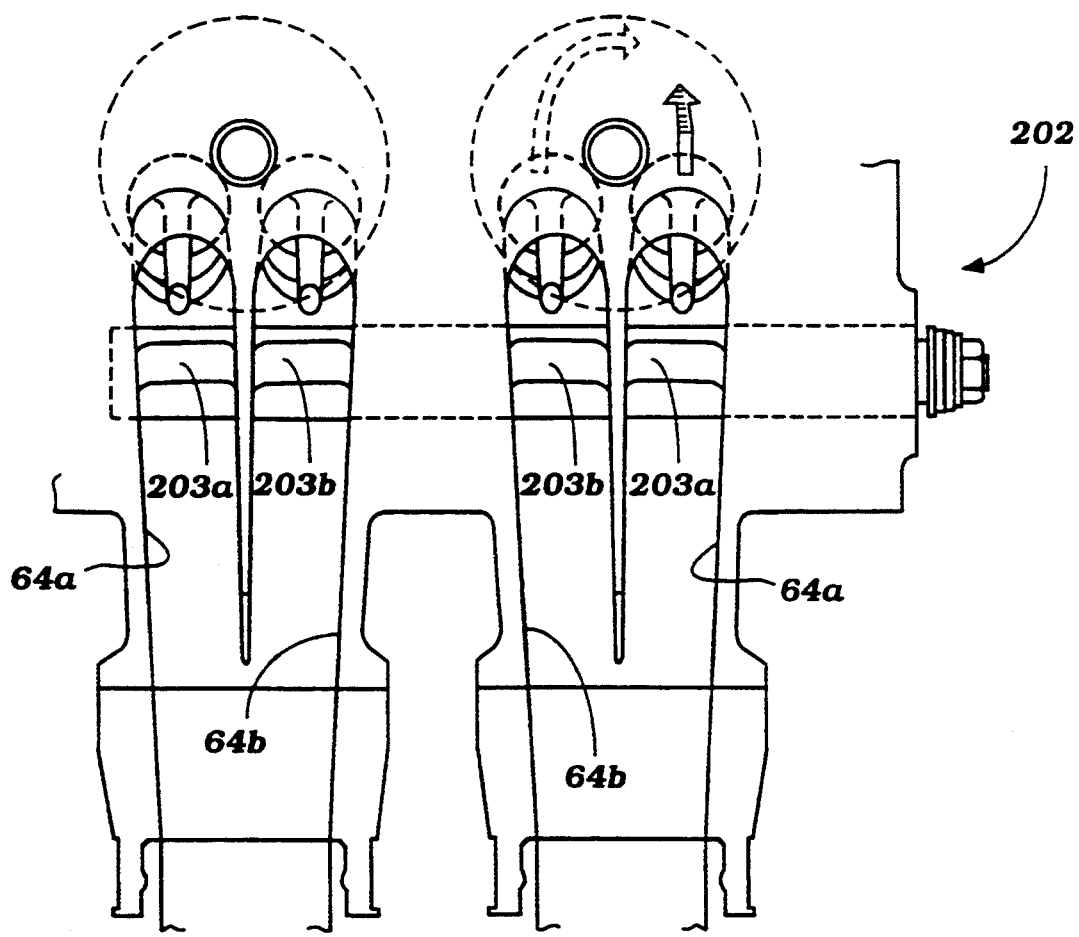
FIG. 12 is cross sectional view taken through the intake passage of this embodiment.

In the embodiments of the invention as thus far described, the cooperation of the valve cut out portions 84a and 84b or 203a and 203b has been such that the flow through the intake passages 64a and 64b is redirected at low and mid speed but is not redirected at wide open throttle. The embodiment of FIGS. 5 and 6 employed an arrangement wherein some swirl or different flow could be generated under wide open throttle but this involved the use of a swirl port 204. FIGS. 10 through 12 show an arrangement wherein the flow pattern may be altered by the valve portions 203a and 203b in either extreme position. Since the construction is otherwise the same as the embodiment of FIGS. 7 through 9, the same reference numerals have been applied here. In FIGS. 10 and 11, however, the flow through the passage 64a has been identified by the broken arrow while the flow through the passage 64b has been indicated by the solid arrows to show how the flow pattern varies under different positions of the control valve 202.

In all of the embodiments of the invention as thus far described, the control valves 83 or 202 have been constructed so that when they are in their second or open positions they offer no flow restriction whatsoever to the intake air flowing through the intake passages 64a and 64b. Furthermore, the shape of the cut outs 84a and 84b or 203a and 203b has been such that they provide a smooth surface to the intake passages 63a and 63b when in their second positions. However, and is may be readily seen from the various figures, when the control valve 83 or 202 are in their first positions there is formed a recess in the intake passages 64a and 64b on the upstream side of the control valve 83 or 202. Fuel may tend to accumulate in this recess and adversely effect the fuel air ratio, particularly under transient conditions. FIGS. 13 through 18 show another embodiment of the invention which is generally similar to the embodiment of FIGS. 1 and 2 and, for that reason, the same or similar components have been identified by the same reference numerals. In this embodiment, an arrangement for provided for purging any air that may accumulate in this cut out area so as to avoid the aforenoted possible problems.

Figure 13:
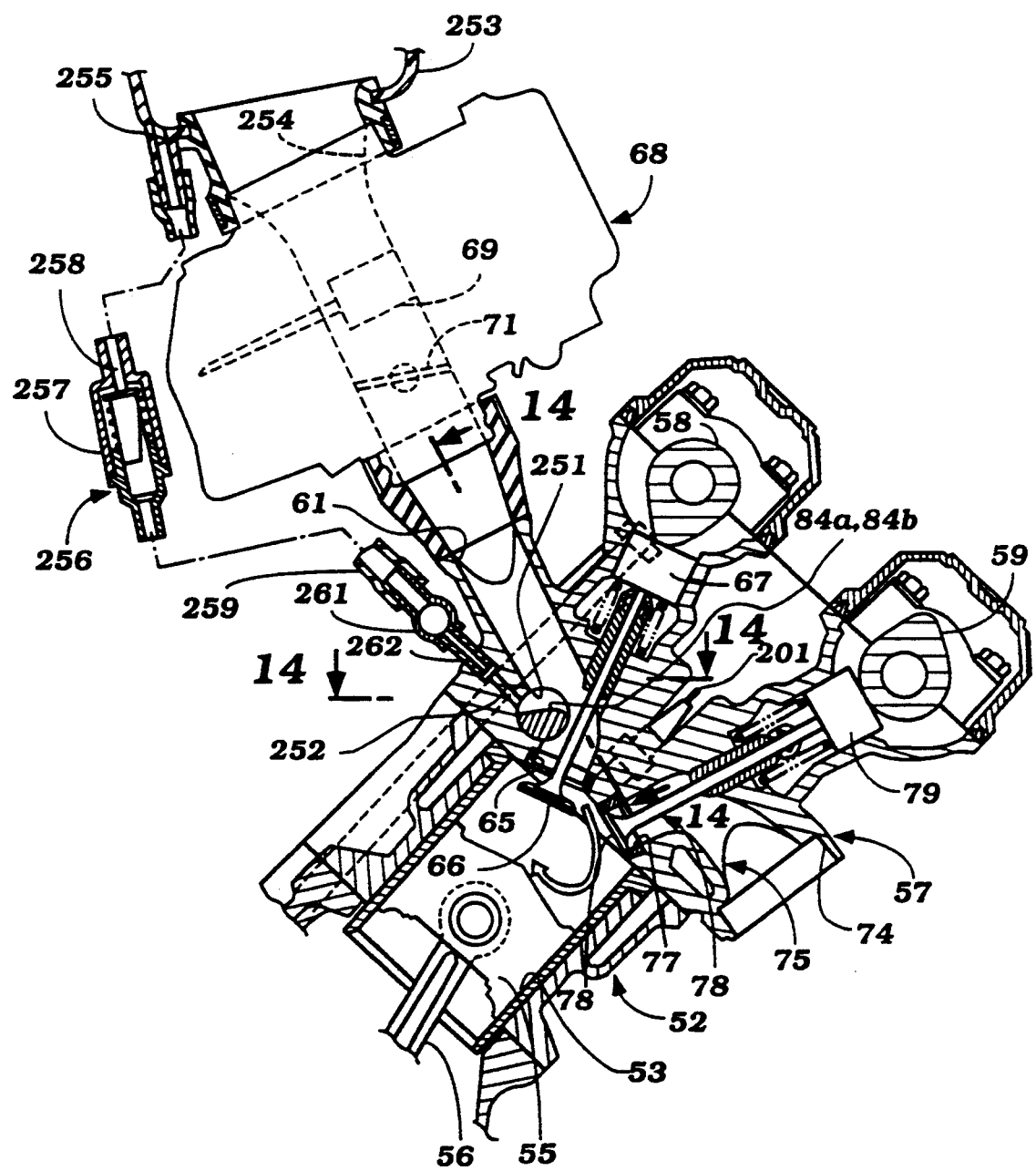
FIG. 13 is a view in part similar to FIGS. 1, 5, 7 and 10 and shows yet another embodiment of this invention.
Figure 14:
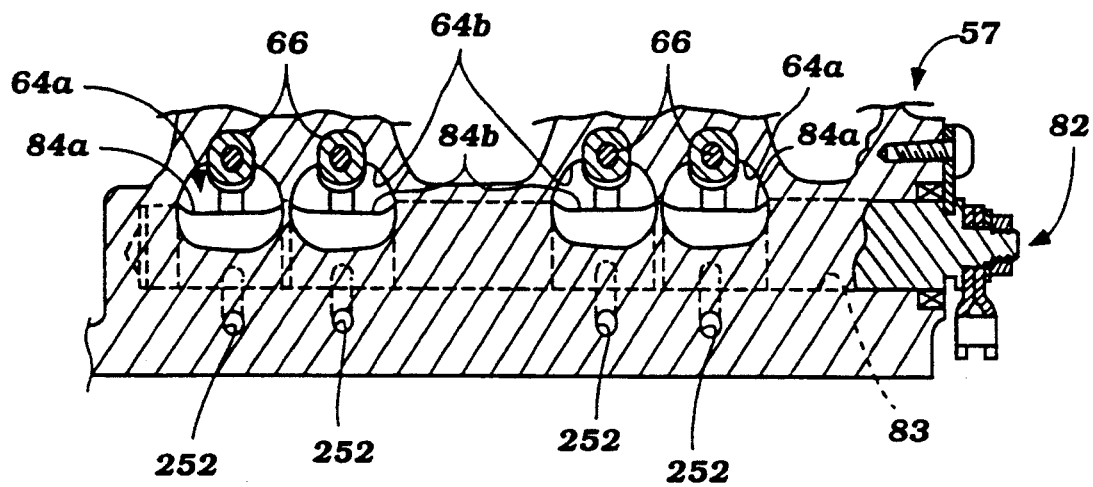
FIG. 14 is a cross sectional view taken along the line 14—14 of FIG. 13 and shows the control valve in its first position.
Figure 15:
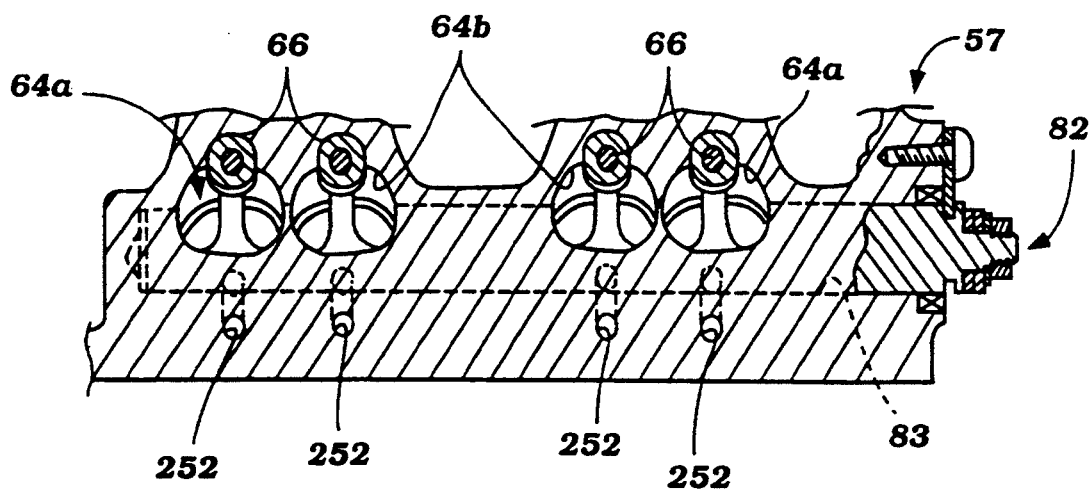
FIG. 15 is a cross sectional view, in part similar to FIG. 14, and shows the control valve in its second opened position.
Figure 16:
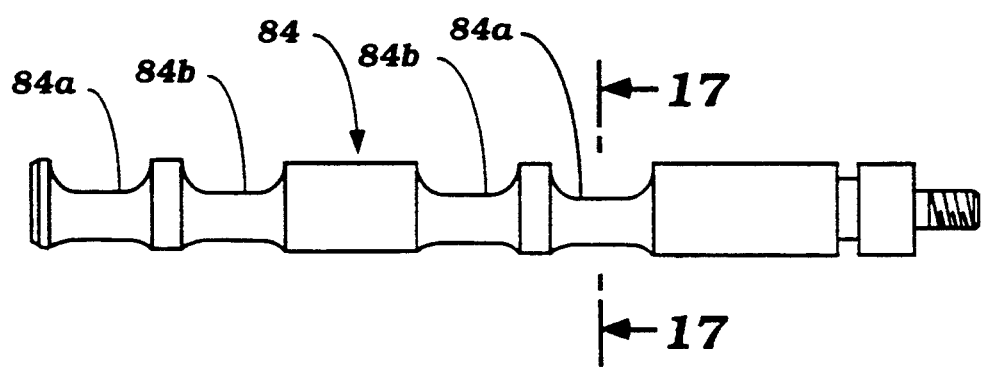
FIG. 16 is a side elevational view of the control valve.
Figure 17:
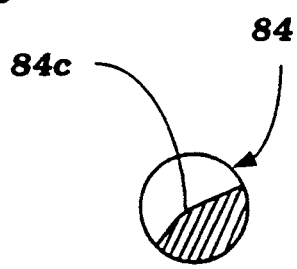
FIG. 17 is a cross sectional view taken along the line 17—17 of FIG. 16.
Figure 18:
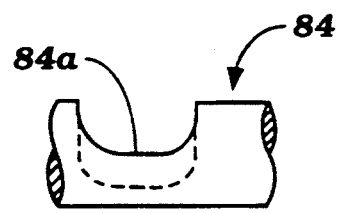
FIG. 18 is a partial view of a portion of the control valve of this embodiment.

As may be seen in FIG. 13, a recess 251 is formed between the cylinder head 57 and the cut outs 84a and 84b of the control valve 84 when the control valve element 84 is in its first position. As has been noted, fuel may accumulate in this recess when the control valve 84 is in this position. There is provided, therefore, a port 252 which extends through the cylinder head 57 and which opens into this recess 251 and which is opened and closed by the control valve 84. Atmospheric air is delivered through the port 252 at a higher pressure than exists in the intake passages 64a and 64b when the respective intake valves 66 are opened so as to blow any condensed fuel from this area. This air is acquired from an air inlet device 253 that cooperates with the air inlet opening 254 of the carburetor 67 to deliver air to them. This air will have been filtered and silenced by an appropriate silencing and air cleaner device. An inlet port 255 extends from the air inlet device 253 to a check valve assembly, indicated generally by the reference numeral 256 and which includes a housing 257 in which a spring biased check valve element 258 is positioned. The check valve element 258 will maintain a closed position except when the pressure at the port 252 is less than atmospheric. A flexible conduit 259 interconnects the valve 256 with a manifold 261 that supplies individual nozzles 262 that extend to the ports 251. Hence, when the control valves 84 are in any position so as to restrict the air flow through the induction passages 64a and 64b and the recesses 251 exist, there will be a flow of higher pressure air from the ports 251 to blow any condensed fuel away from this recess and back into the stream of induction air.

Figure 19:
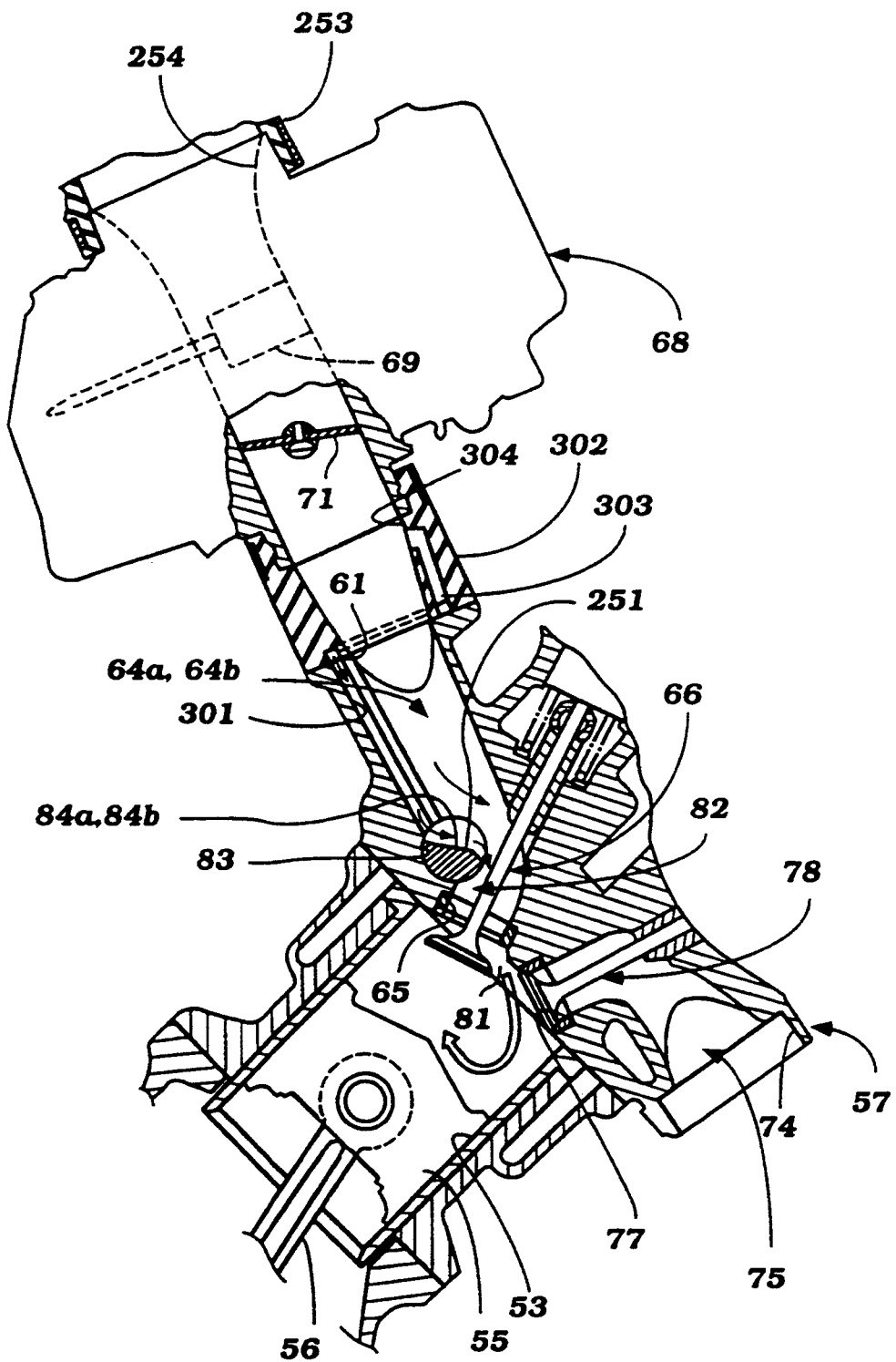
FIG. 19 is a view in part similar to FIGS. 1, 5, 7 and 10 and shows yet another embodiment of the invention.
Figure 20:
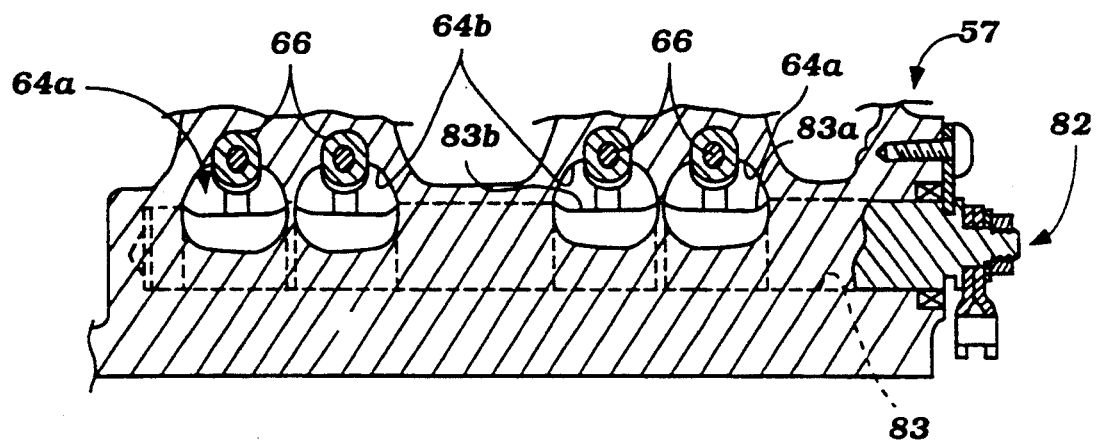
FIG. 20 is a cross sectional view in part similar to FIGS. 2, 8 and 14 showing the control valve of this embodiment in its first position.
Figure 21:
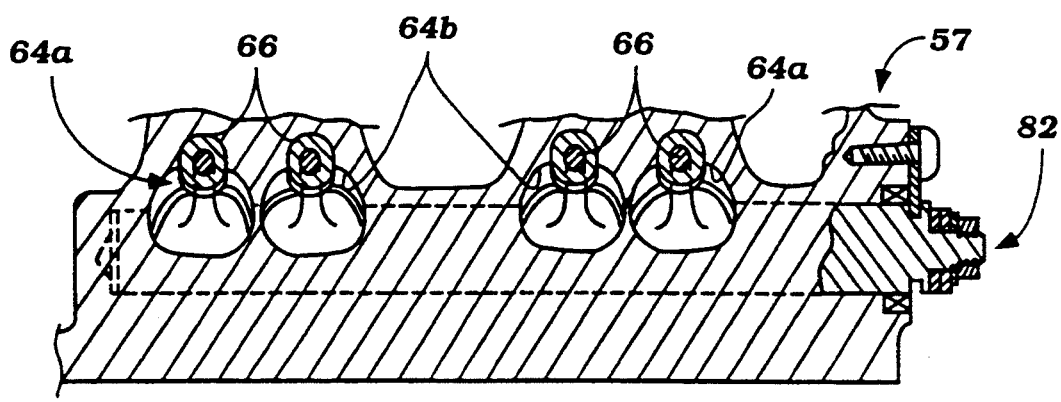
FIG. 21 is a view in part similar to FIG. 20 and shows the control valve in its second position.

FIGS. 19 through 21 show another embodiment of the invention which is generally similar to the embodiment of FIGS. 13 through 18 but in this embodiment the external check valve 256 and manifolding and conduits associated with it are avoided. Also, in this embodiment the intake passages 64a and 64b are inclined toward each other as best shown in FIGS. 20 and 21 so that the air will be channeled more toward the center of the combustion chamber than the outer sides. Such an arrangement may also be employed with any of the previously described embodiments, if desired. Because of the similarity of this embodiment to the embodiments of FIGS. 13 through 18, components which are the same or substantially the same have been identified by the same reference numerals and will not be described again.

In this embodiment, an air injection port 301 extends through the cylinder head 57 parallel to the intake passages 64a and 64b and terminates at a spacer 302 that is interposed between the carburetor 68 and the cylinder head 57 and specifically its intake port 61. A passageway 303 in this spacer communicates the air injection port 301 with an intake passage 304 formed in the spacer 302 and which communicates with the downstream end of the carburetor 68. The pressure at this area will be higher than the pressure existent in the recess 251 which is formed when the control valve 84 is in its first position as shown in this figure due to the venturi action that occurs from the restriction of the control valve portions 84a and 84b and the intake passages 64a and 64b, respectively. Hence, there will generated a high velocity air flow that will sweep any fuel away from this recess 251 as with the previously described embodiment.

Figure 22:
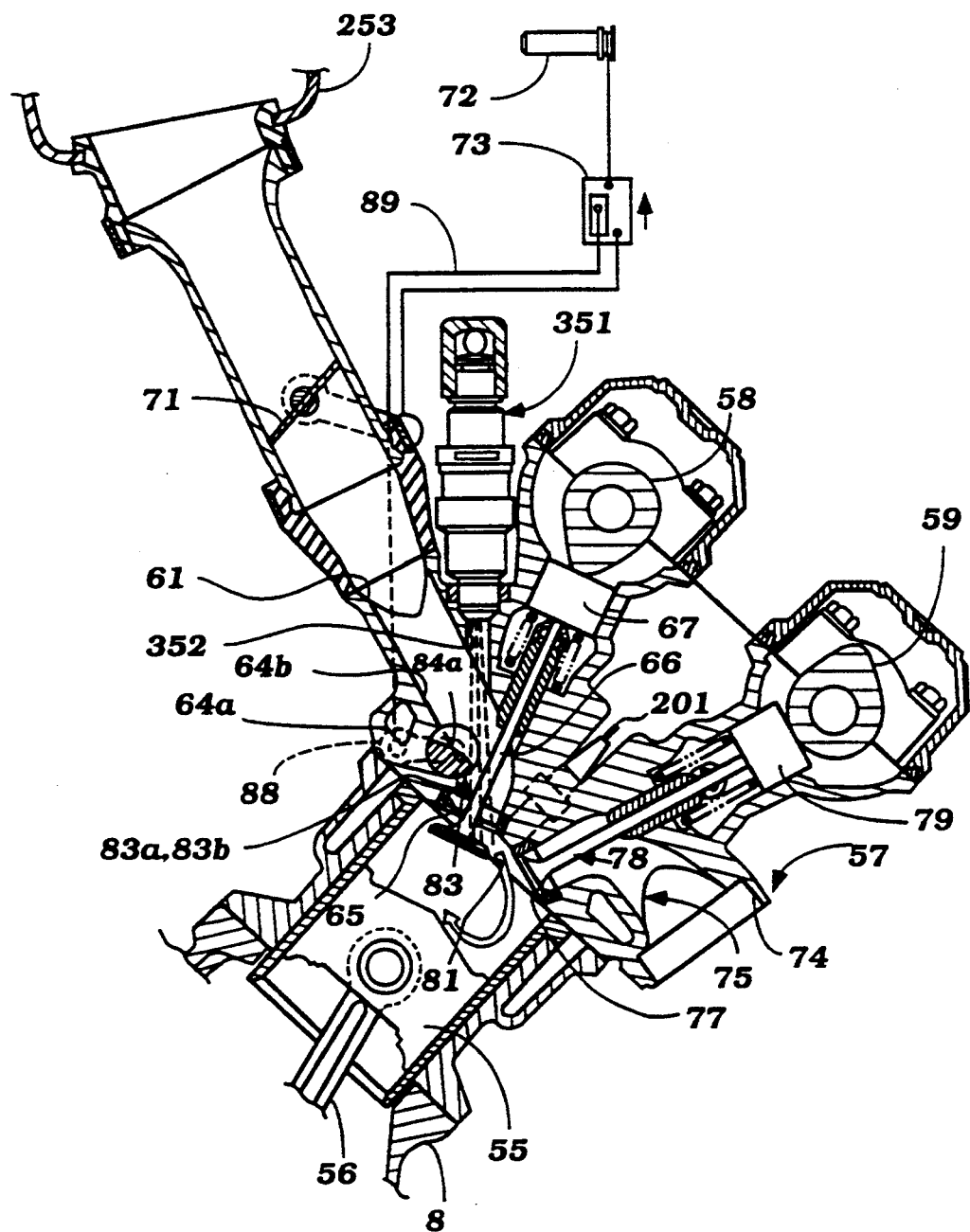
FIG. 22 is a view in part similar to FIGS. 1, 5, 7, 10, 13 and 19 and shows a still further embodiment of the invention.

FIG. 22 shows another embodiment of the invention wherein this problem of fuel condensation in the area of the recess is avoided when the control valve 83 is in its first position. Because this embodiment is similar to the embodiment of FIGS. 13 through 18, except as will hereinafter be noted, components which are the same have been identified by the same reference numerals and will not be described again, except in so far as is necessary to understand the construction and operation of this embodiment.

In this embodiment, the use of an air injection port is avoided by providing a fuel injection system and directing the fuel from the fuel injector in such a way that it will not impinge upon the control valve element 84 or if it does it does it on its downstream side, even when the control valve 84 is in its full first position. As may be seen in FIG. 22, a fuel injector 351 is mounted in the cylinder head between the intake passages 64a and 64b and the intake camshaft 58. The fuel injector 351 sprays through a discharge port 352 which intersects one or both of the passages 64a and 64b, as described in conjunction with the embodiments of FIGS. 3 or 4, and thus sprays toward the side of the passages 64a and 64b not obstructed by the control valves 84. As may be seen in this figure, when the control valve 84 is in its full first position it will slightly be intersected by the spray of fuel from the injector 351. This provides no problem, however, since the spray is on the downstream or protruding side of the recesses 84a and/or 84b and hence will be swept from this area by the high velocity air flow. In addition, this spray of fuel on the control valve 84 in this position may provide some desired cooling for the control valve 84.

In certain of the embodiments as thus far described the control valve, in addition to changing the effective flow pattern through the intake passages also controls a source of supplemental air flowing to the combustion chambers. FIGS. 23 through 28 disclose such an embodiment which is generally similar to the embodiment of FIGS. 1 and 2 and, therefore, has been identified by the same reference numerals as applied in that figure. In this embodiment, however, supplemental air is delivered under higher pressure to the intake passages through the control valve itself as will be readily apparent by the following description of this embodiment.

In this embodiment, the control valve is indicated generally by the reference numeral 401 and includes a control valve element 402 which has a generally cylindrical shape and which is supported for rotation in the bore 83. The control valve element 402 has cut out portions 403 which form the control surfaces, as with the cut outs in the previously described embodiment. As previously noted, these cut outs 403 may be configured to provide only tumble or tumble and swirl to the flow through the intake passages 64a and 64b into the cylinder.

Figure 24:
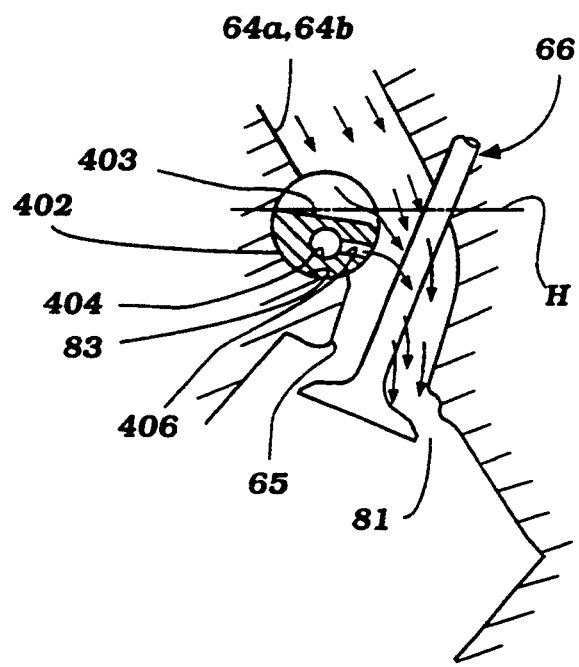
FIG. 24 is an enlarged cross sectional view taken in a plane parallel to FIG. 23 and shows the control valve and its relationship to the intake port of this embodiment.
Figure 25:
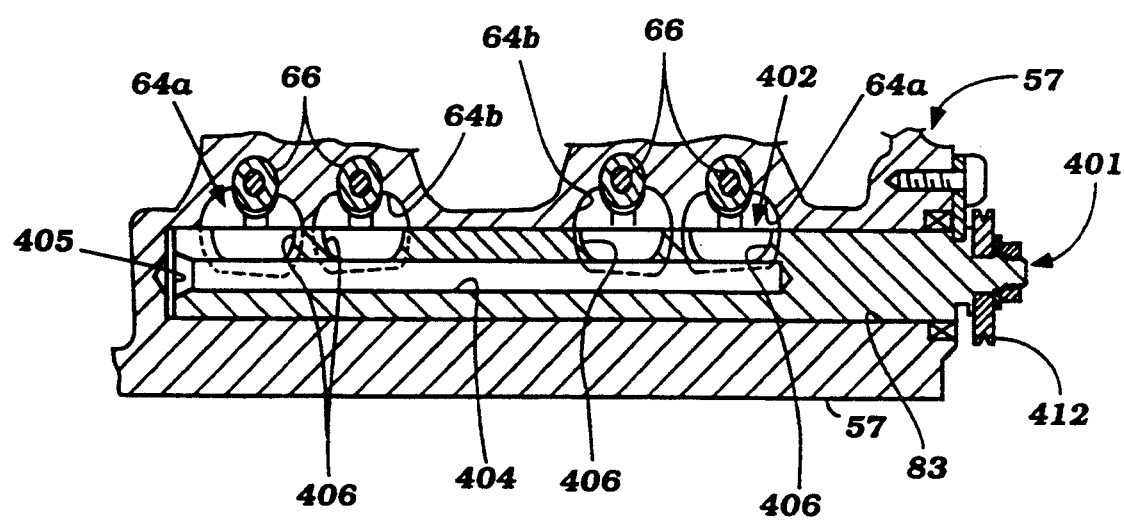
FIG. 25 is a cross sectional view taken along the line 25—25 of FIG. 23.
Figure 26:
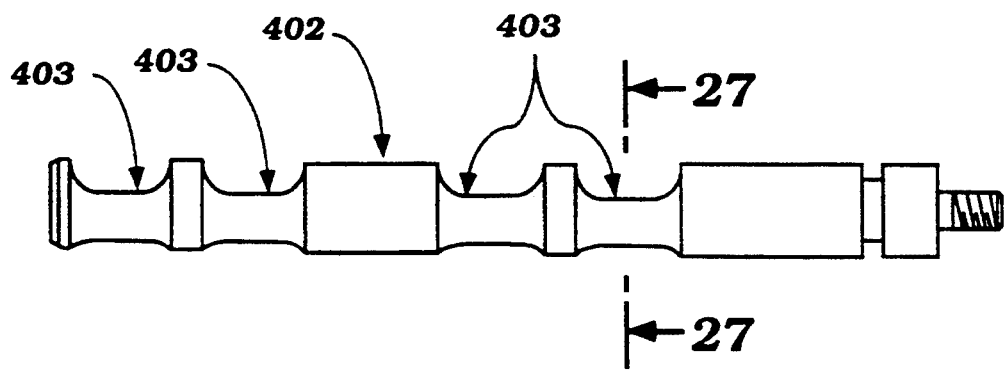
FIG. 26 is an enlarged side elevational view of the control valve of this embodiment.
Figure 27:
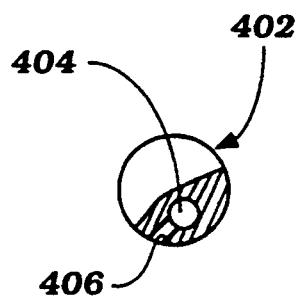
FIG. 27 is a cross sectional view taken along the line 27—27 of FIG. 26.
Figure 28:
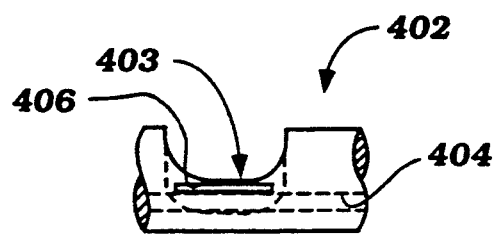
FIG. 28 is an enlarged view of a portion of the control valve of this embodiment looking in a different direction from FIG. 26.

The control valve element 402 further has an axially extending passageway 401 which extends through one of its ends and which is closed at its opened end by a wall 405 formed in the cylinder head 57 at the base of the bore 83. The passageway 404 is intersected by a means of plurality of chordal slots 406 having a configuration as best shown in FIG. 25 that open through slits in the outer surface which is disposed in a clockwise direction from the cut outs 403 as shown in FIG. 24. When the control valve element 402 is fully in its first position, these chordal slits 406 are disposed at an acute angle to a horizontal plane H so as to discharge in a generally downward direction but against the stems of the intake valves 66.

As described in conjunction with the embodiment of FIGS. 5 and 6, when one cylinder has its intake valve 66 open, the flow of atmospheric air from another cylinder can issue through the open slot 406 for discharge into the combustion chamber at a high velocity. This will not only add to the turbulence of the air but also cool the valve element 402 and to some extent the intake valve 66.

Figure 23:
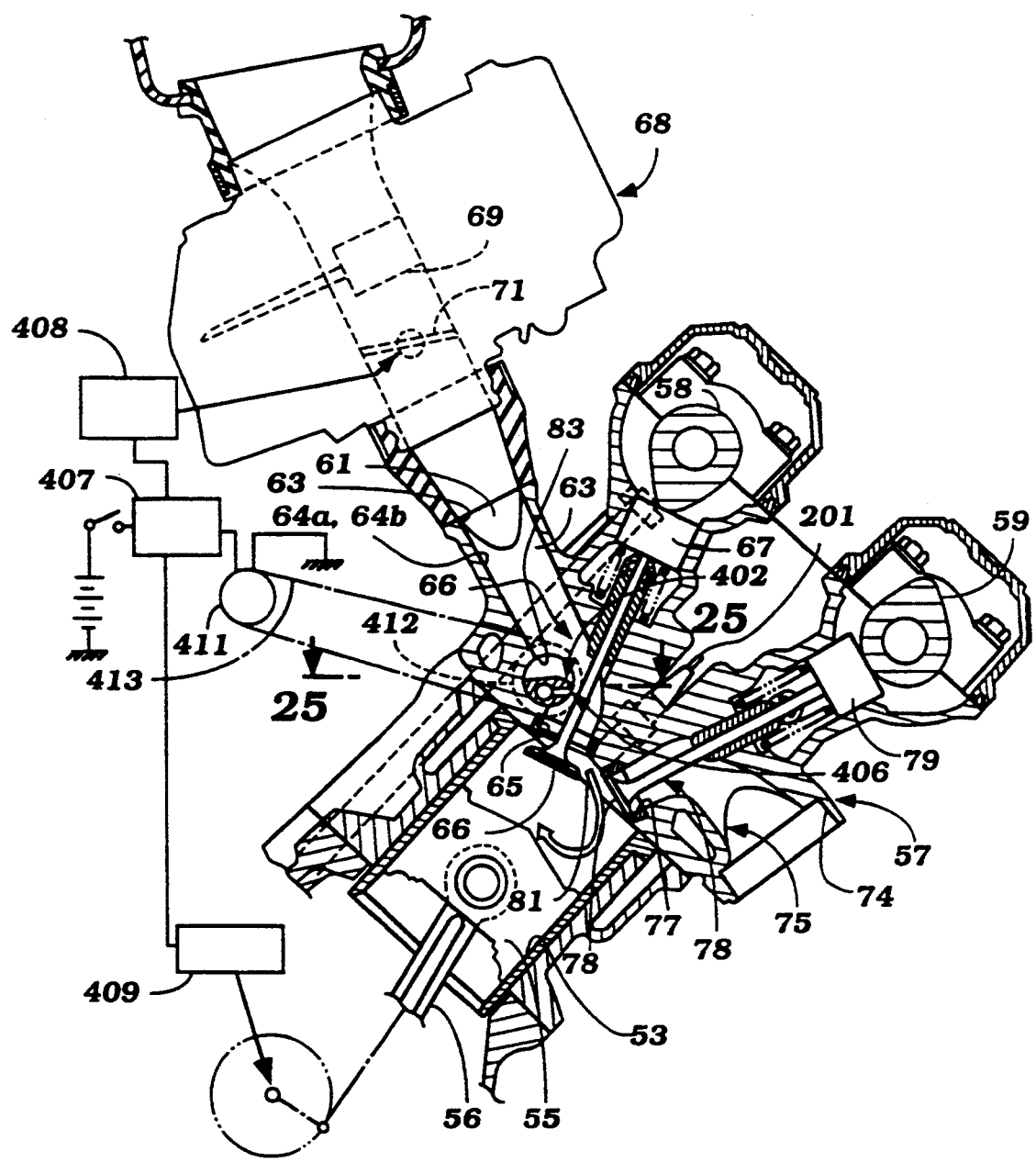
FIG. 23 is a view in part similar to FIGS. 1, 5, 7, 10, 13, 19 and 22 and shows yet another embodiment of this invention.

FIG. 23 also shows a different form of control for operating the valve element 402 in this embodiment. In this embodiment the control valve element 402 is controlled by a CPU 407 which receives inputs from a throttle position sensor 408 and a crankshaft speed sensor 409. In accordance with a suitable program, the CPU 407 then controls a stepper motor 411 which drives a pulley 412 fixed to the end of the control valve element 402 via a belt or like transmitter 413. Basically, the control valve 401 is closed under high speed high load conditions and opens under low speed low load conditions to increase turbulence under these conditions.

Figure 29:
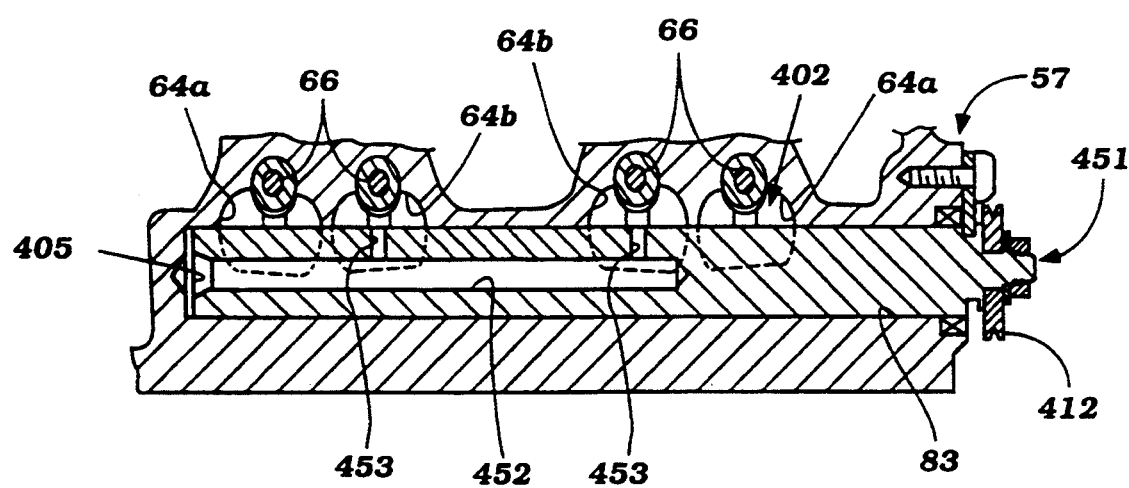
FIG. 29 is a cross sectional view, in part similar to FIG. 25, but shows a different embodiment of the control valve arrangement.

FIG. 29 shows another embodiment of the invention which is generally similar to the embodiment of FIGS. 24 through 28. In this embodiment, however, the air ports are arranged so as to provide a swirling action when they are opened and aside from this difference, the construction is the same as the previously described embodiment. For that reason, common components have been identified by the same reference numerals. In addition, this construction can be fully understood by reference to only a single figure corresponding to FIG. 25 of the previous embodiment.

The control valve element in this embodiment is identified by the reference numeral 451 and in this embodiment a bore 452 extends from the blind end 405 of the bore 83 but terminates at only the intake passage 64b of the respective cylinder. It need not extend to the full end since only the ports 64b of adjacent cylinders are communicated with each other in this embodiment and these cylinders fire alternately to each other. Radially extending bores 453 intersect the passage 452 and thus permit air flow from one passage 64b to the other depending on which intake valve 66 is opened, as previously described.

Figure 30:
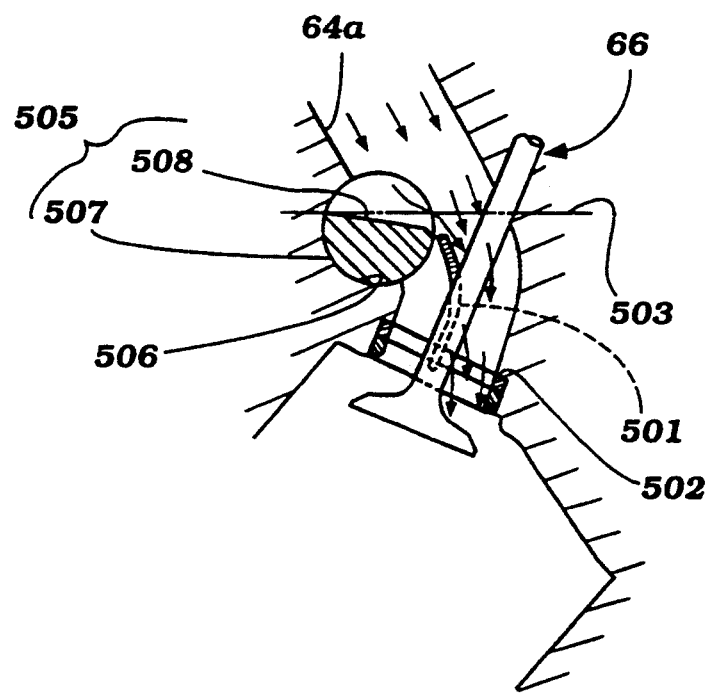
FIG. 30 is an enlarged cross sectional view, in part similar to FIG. 24 and shows another embodiment of the invention.
Figure 31:
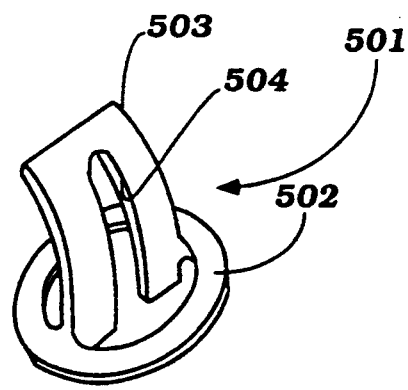
FIG. 31 is a perspective view of the combined valve seat rectifier plate of this embodiment.

In all of the embodiments as thus far described, the control valve has been positioned at the bight where the two intake passage portions meet each other and relatively close to the valve seat 65. In this way, the control valves themselves have been able to cause the different flow patterns depending upon their positions. FIGS. 30 and 31 show another embodiment of the invention that includes an additional device, in the form of a rectifier plate (to be described) which cooperates with the control valve and specifically its valving surface to further control the air flow.

In this embodiment, one or both intake valves 66 associated with each cylinder cooperates with a valve seat rectifier plate assemblage, indicated generally by the reference numeral 501. This assemblage includes an annular valve seat portion 502 that forms a valve seat as with all of the previously described embodiments. However, a rectifier plate portion 503 extends integrally upwardly from the valve seat portion 502 and into the respective intake passage 46a and/or 46b depending upon whether one or both passages is controlled by a control valve element. The rectifier plate portion 503 is formed with a cut out slot 504 so as to pass the stem of the respective intake valve 66.

A control valve element is depicted and is identified generally by the reference numeral 505. Like the previously described embodiments, the control valve element 505 is supported in a bore 506 at the bight of the respective intake passage 64a and/or 64b. The valve element 505 has a cylindrical portion 507 that is cut out at 508 to form the flow controlling area.

As may be readily seen in FIG. 30, when the control valve element 501 is in its first position, the cut out 508 extends to the upper periphery of the rectifier plate portion 503 and all air will be directed to the outer side of the respective inlet passage 64a to further improve the tumble action.

With this embodiment, since the rectifier plate portion 503 is formed integrally with the valve seat 502, a separate element inserted into the cylinder head which might become displaced is avoided as is a complicated casting practice. Also, the way in which the valve seat is pressed into the cylinder head will further insure against any displacement of this element.

With this embodiment, also, when operating with the control valve element 505 in its second, fully opened position, the rectifier plate portion 503 also serves the function of providing more laminar flow to the intake charge and improves the volumetric efficiency of the engine and the flow distribution within the individual cylinders.

It should be noted that in each of the embodiments as thus far described and as is typical with an important feature of the invention in all embodiments including those yet to be described, the control valve has been positioned at the lower side of the bight where the two intake passage portions meet. This means that the control valve is disposed outwardly of the intake valve and this not only permits a more compact assembly but also permits the intake valves to be angled at a more substantial angle to a transverse plane containing the cylinder bore axis (A). This also positions the control valve between the cylinder head to cylinder block fasteners, as will be described in conjunction with the embodiments now to be described. Furthermore, this placement permits the control valves to be cooled by additional cooling jackets formed in the cylinder head and cylinder block as will also be described.

A further embodiment of the invention disclosing these features is illustrated in FIGS. 32 through 35 and will now be described by particular reference to those figures. In this discussion, components of the engine which have already been described in detail have been identified by the same reference numerals and will be described again only in so far as is necessary to understand the construction and operation of this embodiment. In this embodiment, the control valve has been identified by the reference numeral 84 as with the embodiment of FIGS. 1 and 2 but the control valve 84 has a construction of the rod type as shown in some of the later embodiments. It is to be understood that this construction may be employed with any of the types of control valves previously described and those providing any type of desired flow pattern. This embodiment also discloses all four cylinders of the engine and shows how that the cylinder block and cylinder head is divided to provide a cam drive chamber 551 disposed between the adjacent center pair of cylinders so as to in effect divide the engine into two, two cylinder engines end to end. Because of this central drive for the camshafts, there is provided a separate control valve element 84 at each end of the engine.

Also, this construction shows a slightly different positioning for the fuel injector 102 which injects to a passageway 552 formed on the lower or outer sides of the intake passages 61 and toward the control valve element 84. Like the previously described embodiments, one or two fuel injectors may be provided for each cylinder.

Figure 32:
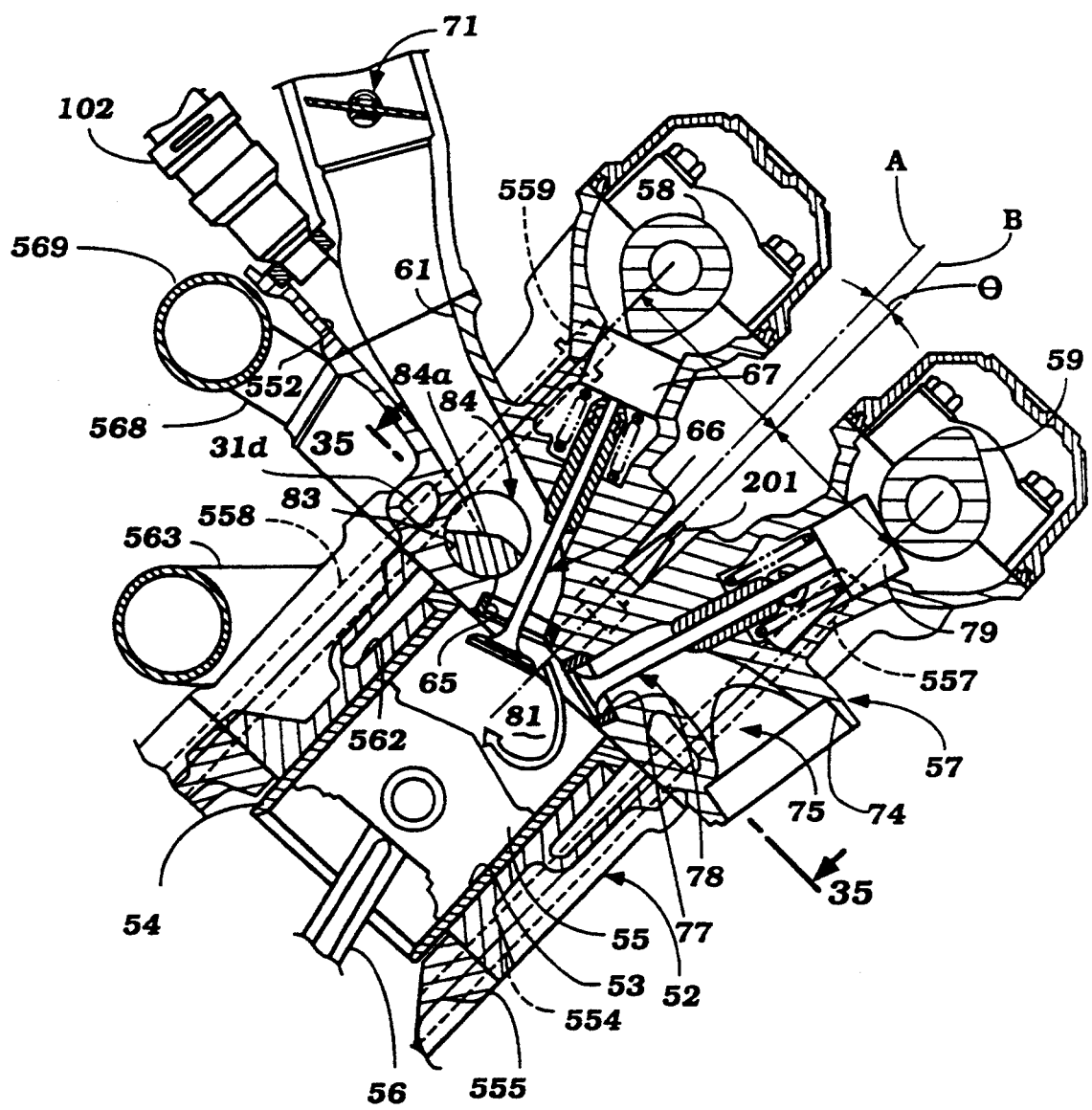
FIG. 32 is a view in part similar to FIGS. 1, 5, 7, 10, 13, 19, 22 and 23 and shows still another embodiment of the invention.
Figure 33:
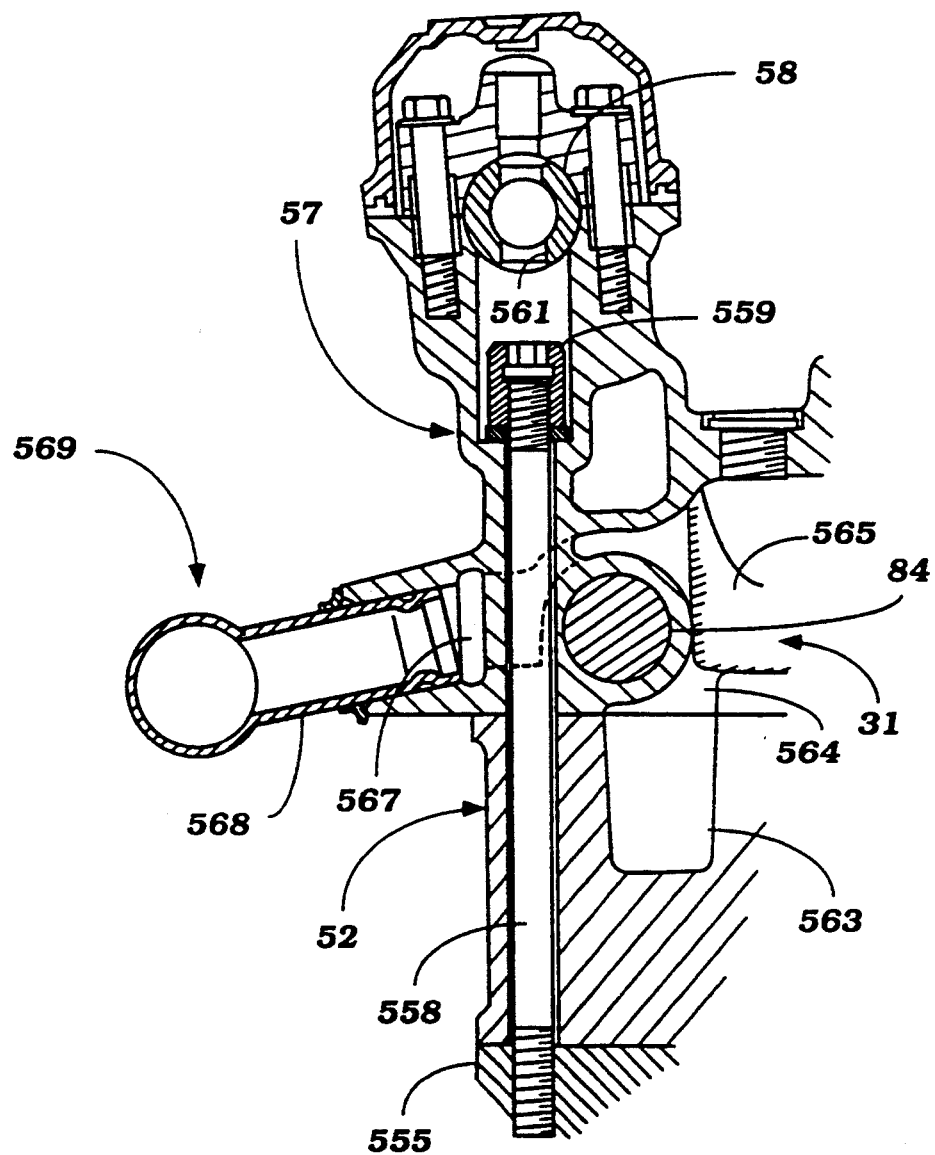
FIG. 33 is an further enlarged cross sectional view taken along a plane parallel to the plane of FIG. 32 but through one of the threaded fastening means.
Figure 34:
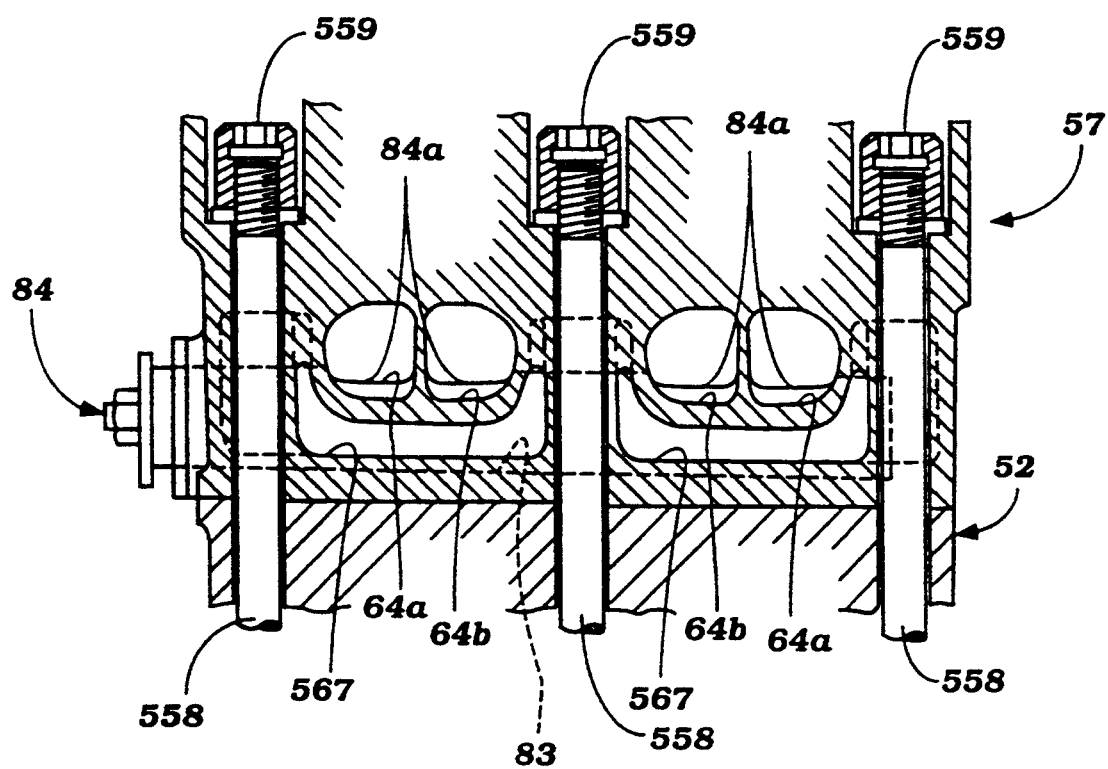
FIG. 34 is a cross sectional view taken along a plane perpendicular to the plane of FIG. 33 and passing through the threaded fastening means.
Figure 35:
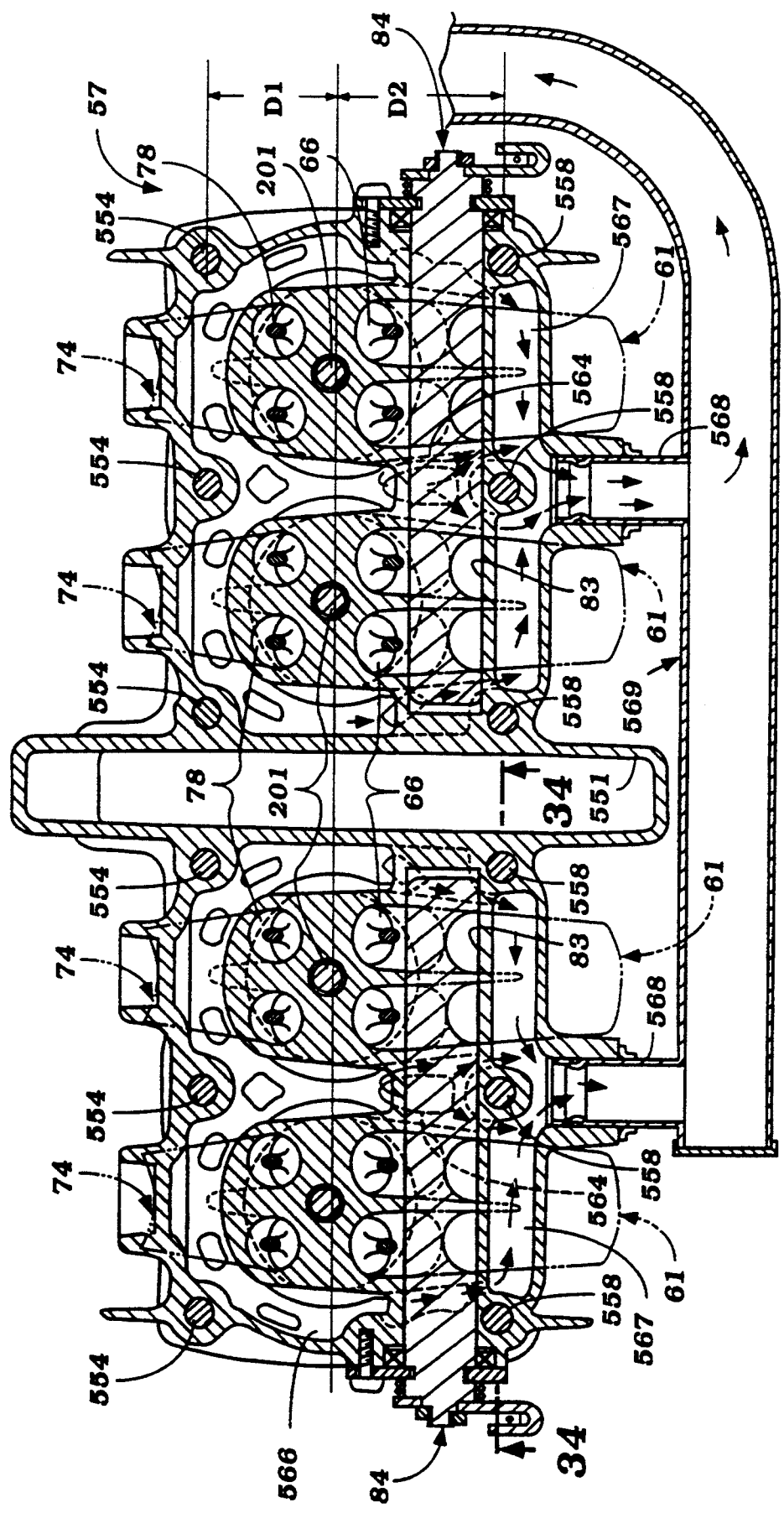
FIG. 35 is an enlarged cross sectional view taken along the line 35—35 of FIG. 32.

FIG. 32 also shows the inclination of the spark plug 201 at the angle from a plane containing the cylinder bore axis (A) which plane is perpendicular to the lower ceiling surface of the cylinder head 51. These planes intersect at the point of mating so that the exhaust camshaft 59 is offset at a lesser distance D1 from the axis of the cylinder bore than the axis of rotation of the intake camshaft 58 indicated by the dimension D2. The cylinder bore axis is shown at the plane c in FIG. 35. This offsetting relationship is desirable, for a reason which will be described so as to facilitate the placement of the control valve 84 without interfering with the threaded fasteners that fix the cylinder head 57 to the cylinder block 52, as has been aforeluded.

A plurality of exhaust side studs 554 are disposed on the exhaust side of the engine and are threaded at their lower ends into a crankcase member 555. These exhaust side studs 554 pass through bores in the cylinder block 52 and corresponding bores in the cylinder head 57 and lie on a perpendicular plane that contains the axis of rotation of the exhaust camshaft 59. Hence, these elements are aligned and lie at the distance D1 from the cylinder bore axis lying on the plane c. Socket headed nuts 557 are threaded onto the upper ends of the exhaust sides studs 554 and hold this side of the cylinder head 57 to the cylinder block 52 and crankcase 555. These socket headed nuts 557 may be accessed through openings in the exhaust camshaft 59 like those associated with the intake camshaft as may be best understood by particular reference to FIG. 33.

On the intake side of the engine and in line with the axis of rotation of the intake camshaft 58 there is provided a series of intake side studs 558 which are threaded at their lower ends into the crankcase 555 and pass through corresponding bores in the cylinder block 52 and cylinder head 57. Socket headed nuts 559 affix these elements to each other. The bores in the camshaft through which the socket headed nuts 558 may be accessed are shown at 561 in FIG. 33.

As may be readily seen in the figures, the greater distance in positioning of the intake studs 558 from the cylinder bore axis c than the distance between the exhaust studs 554 and this axis provides ready clearance for the control valve 84 without any interference.

Like all of the illustrated embodiments of this invention, the engine is water cooled and the cylinder head and cylinder block are each formed with respective cooling jackets. In accordance with this embodiment of the invention, portions of these cooling jackets extend in proximity to the control valve 84 for cooling it.

The cylinder block cooling jacket includes a lower portion 562 that generally extends around the cylinder liners 54 and to which water is delivered from a remotely positioned radiator by a water pump through an engine cooling jacket inlet 563. This cooling water then flows upwardly to an upper cylinder block cooling jacket portion 563 (FIG. 33) that extends along the under side of the cylinder head in proximity to the bore 83 and supported control valve 84. This cooling water then flows through apertures 564 formed in the lower surface of the cylinder head 57 to a further cooling jacket portion 565 formed in the cylinder head 57 around the bore 83 and around the control valve 84. This coolant is then free to also pass through the main cylinder head cooling jacket portion 566. Additional coolant is delivered to the cooling jacket portion 566 through other passages that communicate the cylinder block cooling jacket 562 with these portions.

Coolant is then discharged on the opposite side of the control valve 84 to a pair of longitudinally extending cooling jackets 567 formed adjacent an outer surface of the cylinder head 57 and which communicate with pipes 568 of a coolant manifold, indicated generally by the reference numeral 569 and which lies at the intake side of the cylinder head 57. This coolant is then returned back to the heat exchanger in an appropriate manner and a thermostat (not shown) may control this flow to maintain the desired temperature of the engine.

Figure 36:
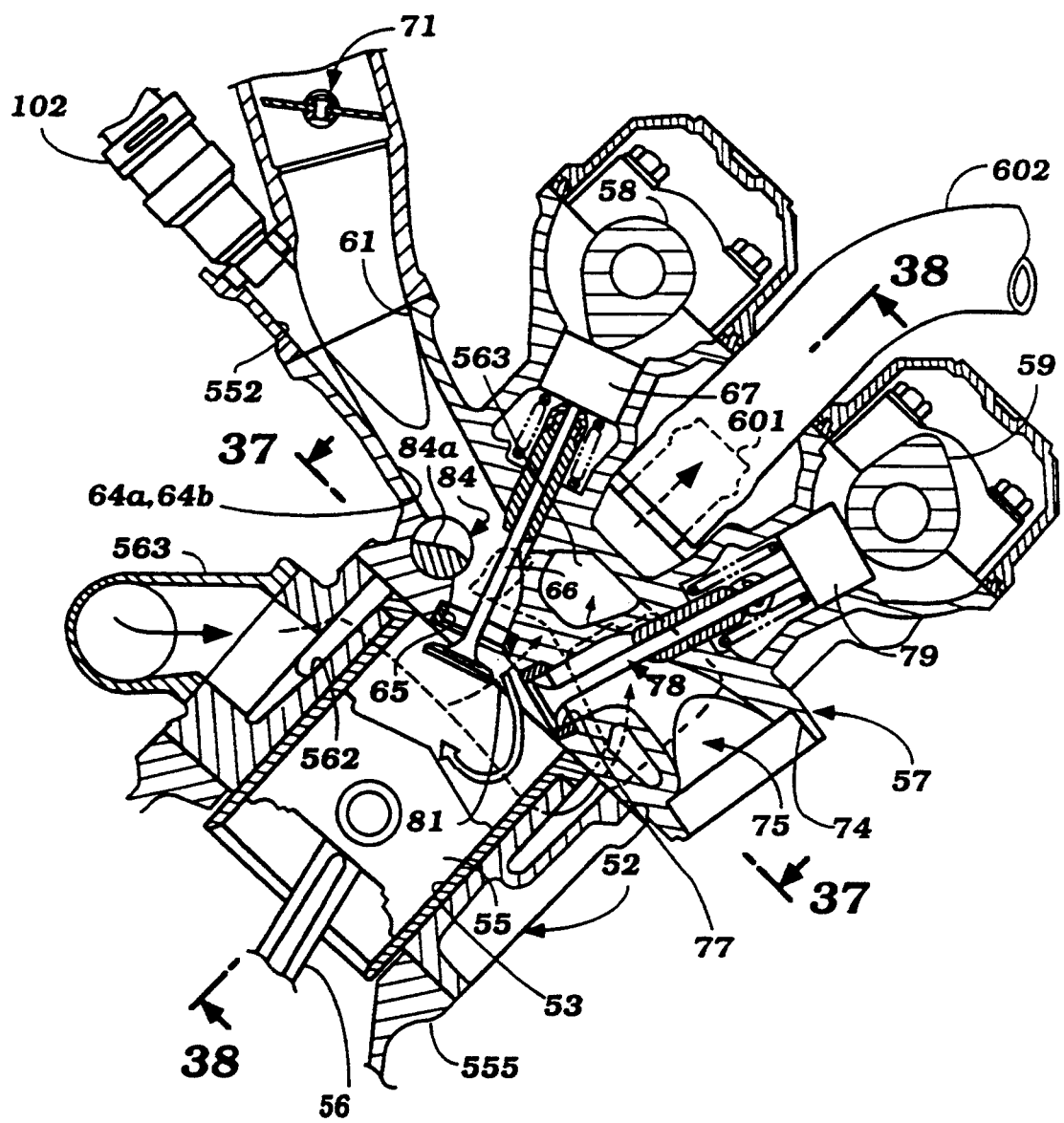
FIG. 36 is a view in part similar to FIGS. 1, 5, 10, 13, 19, 22, 23 and 32 and shows a still further embodiment of the invention.
Figure 37:
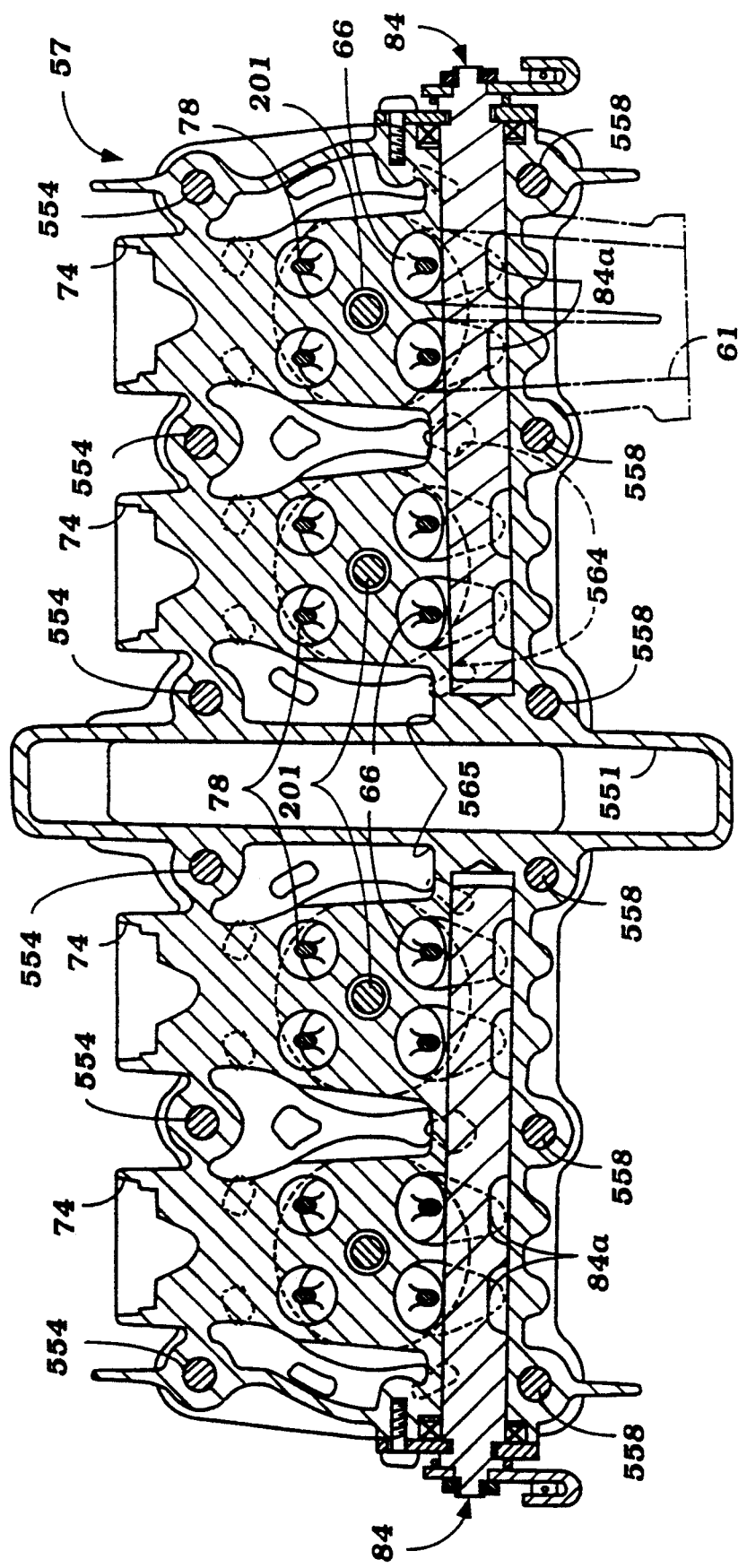
FIG. 37 is an enlarged cross sectional view taken along the line 37—37 of FIG. 36.
Figure 38:
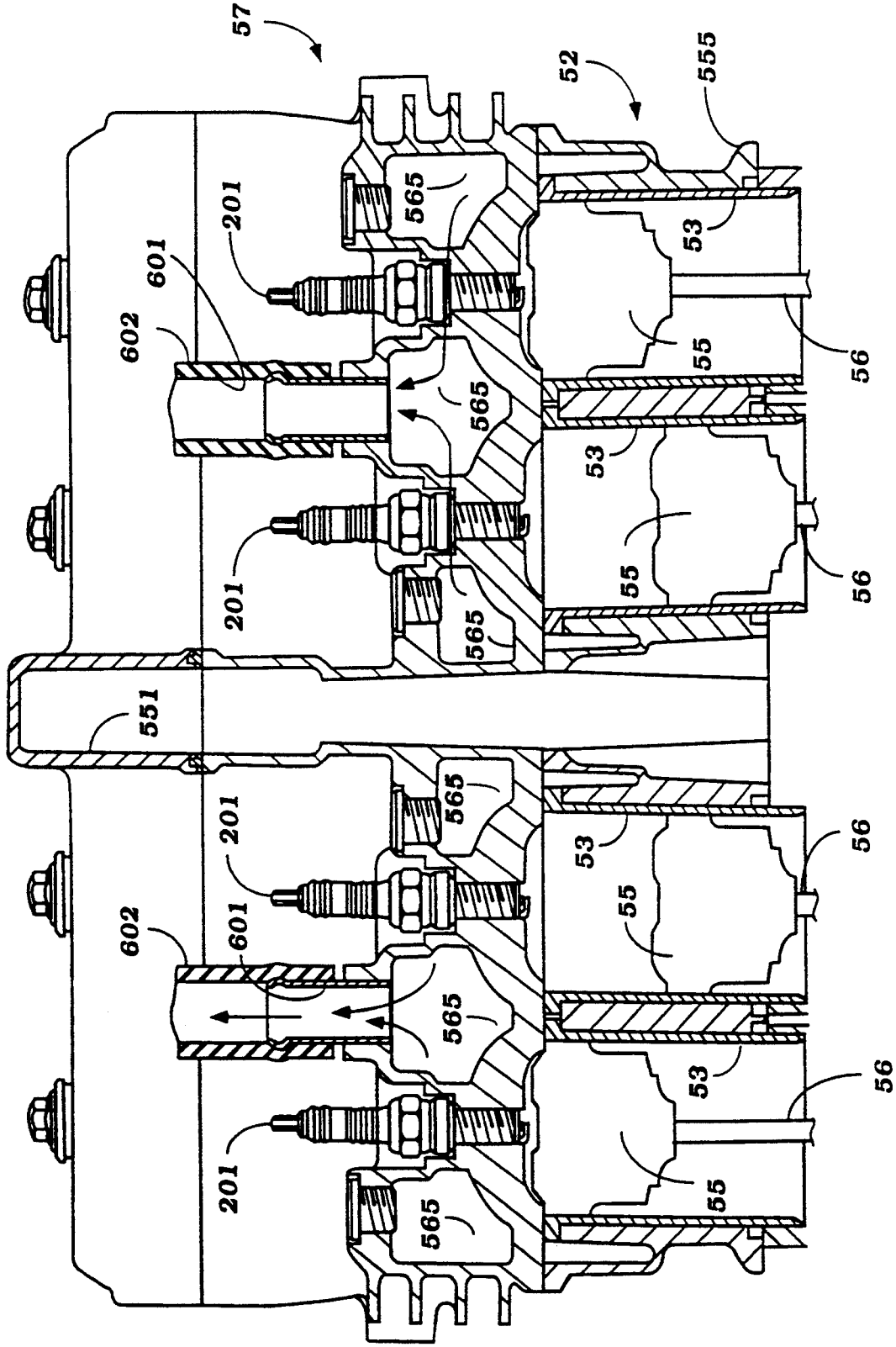
FIG. 38 is an enlarged cross sectional view taken along the line 38—38 of FIG. 36.

FIGS. 36 through 38 show another embodiment of the invention which is generally the same as the embodiment of FIGS. 32 through 35 and, for that reason, components which are the same have been identified by the same reference numerals. This embodiment differs from the previously described embodiment only in two regards. First, it eliminates the cylinder block upper cooling jacket portion 563 that forms an area for cooling the control valve 84. Also, the cylinder head cooling jacket portions 565 have a pair of outlet nipples 601 in this embodiment that are disposed between the pairs of spark plugs 201 of the adjacent groups of cylinders. Flexible hoses 602 carry coolant from these cooling jacket outlets 601 to the remotely positioned radiator.

Figure 39:
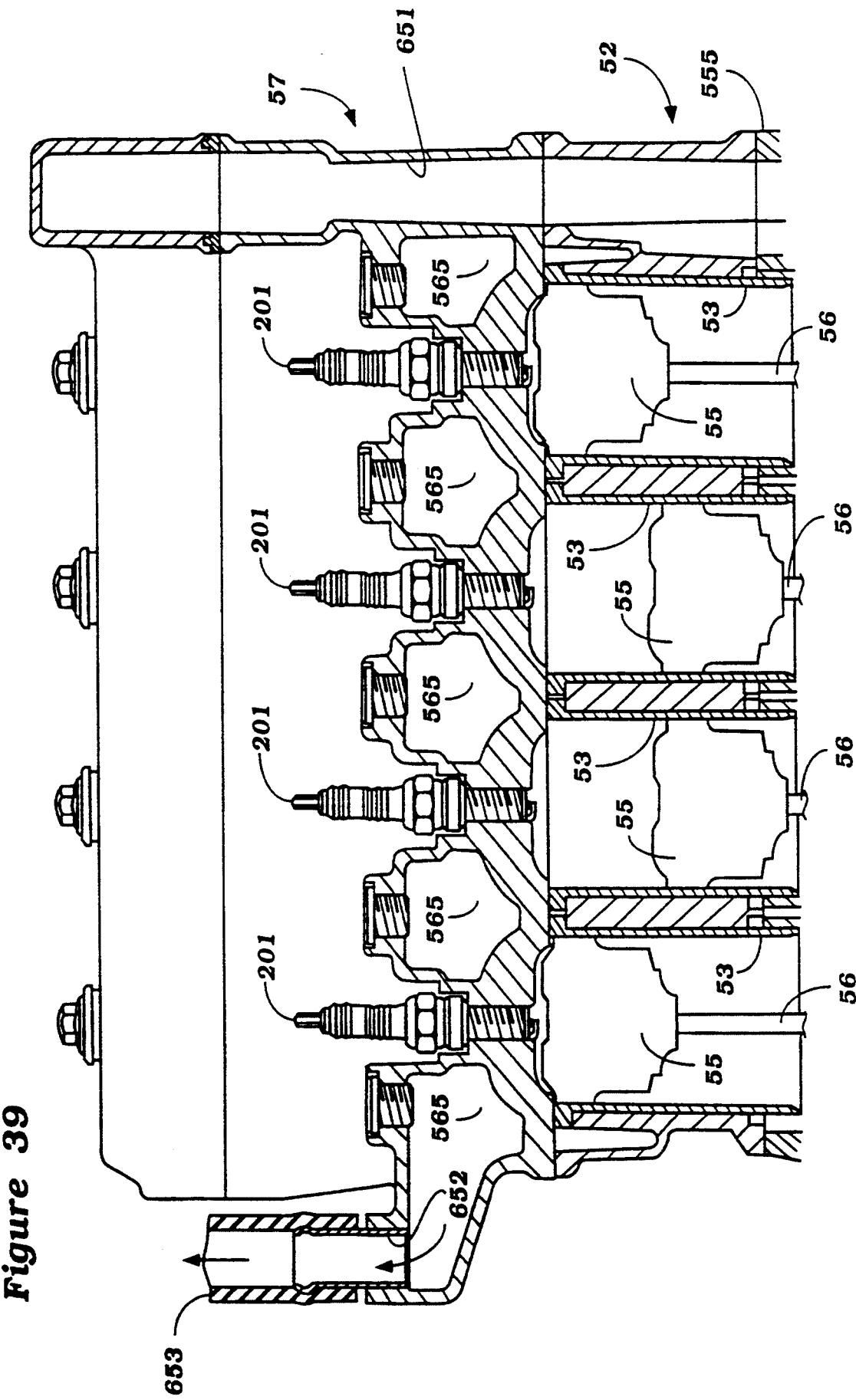
FIG. 39 is a cross sectional view, in part similar to FIG. 38, and shows another embodiment of the invention.
Figure 40:
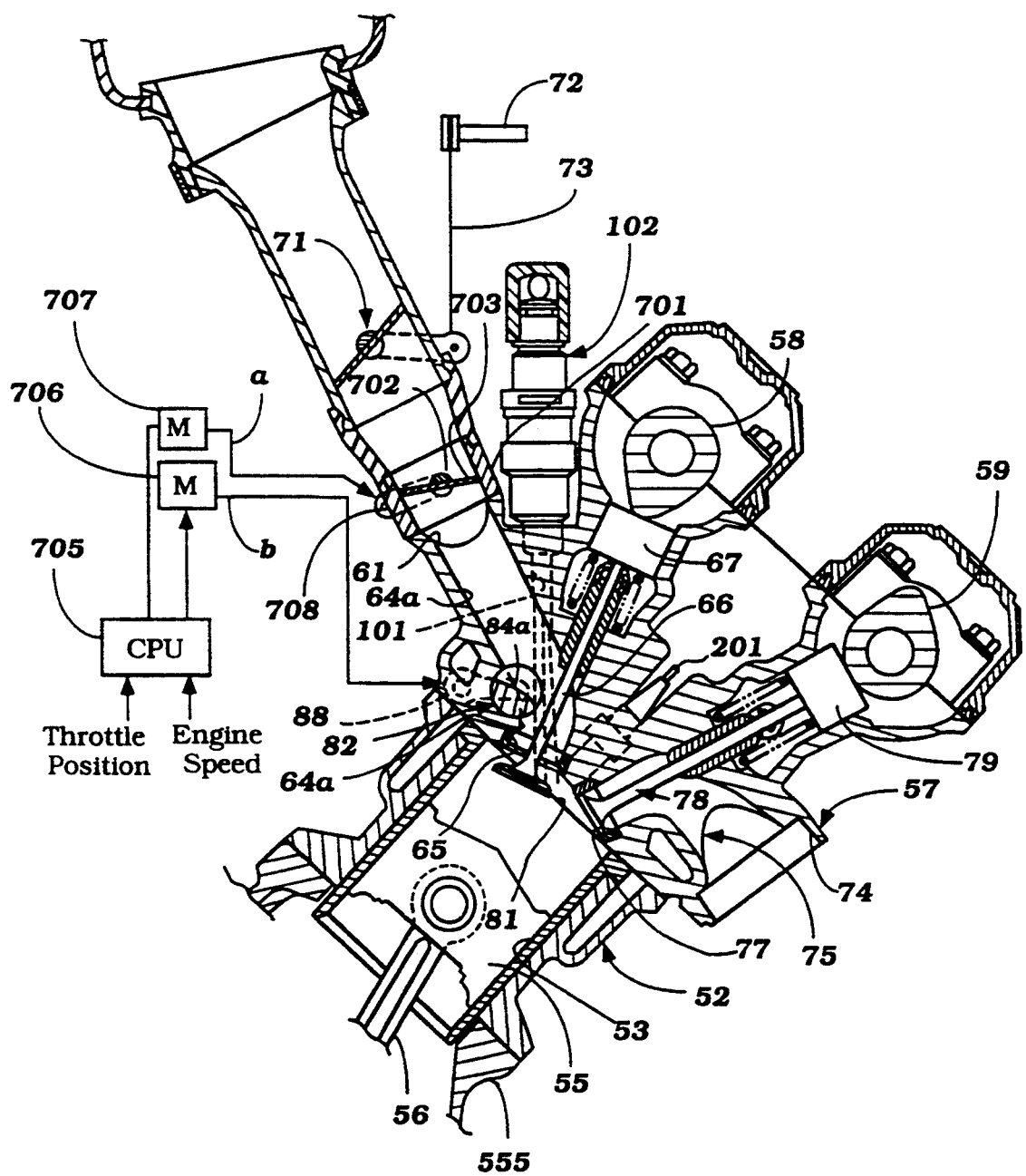
FIG. 40 is a view in part similar to FIG. 1, 5, 7, 10, 13, 19, 22, 23, 32 and 36, and is taken along the line 40—40 of FIG. 41 and shows still another embodiment of the invention.

FIG. 39 shows another embodiment that is similar to the embodiment of FIGS. 36 through 38. In this embodiment, however, the engine is not divided into two separate groups of cylinder banks by the camshaft drive cavity 551. Rather, the camshaft drive is provided in a cavity 651 disposed at one end of the engine, in a well known fashion. As a result of this arrangement, a single coolant outlet nipple 652 may be formed at the opposite end of the cylinder head 57 and collect water from all of the cylinder head cooling jacket portions 565 for return to the remotely positioned radiator through a conduit 653.

Figure 41:
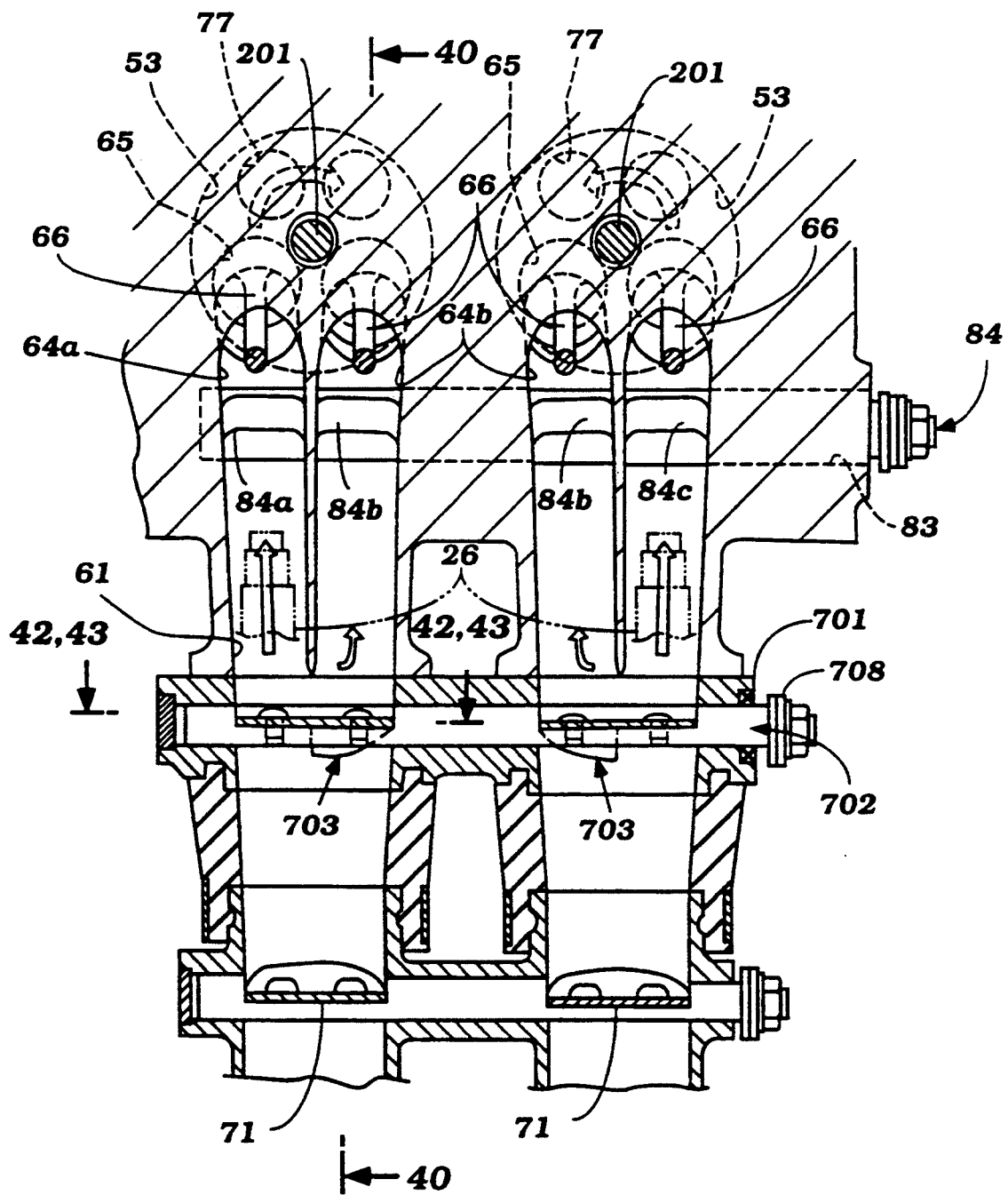
FIG. 41 is an enlarged cross sectional view taken through the intake passages of this embodiment.
Figure 42:
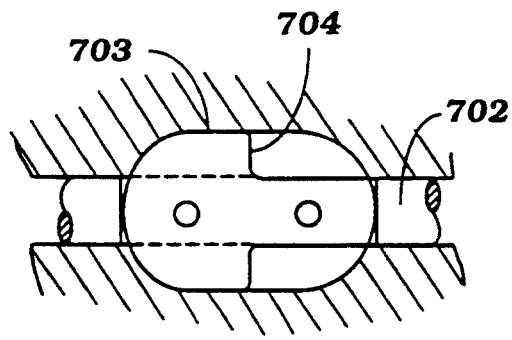
FIG. 42 is a cross sectional view taken along the line 42—42 of FIG. 41.
Figure 43:
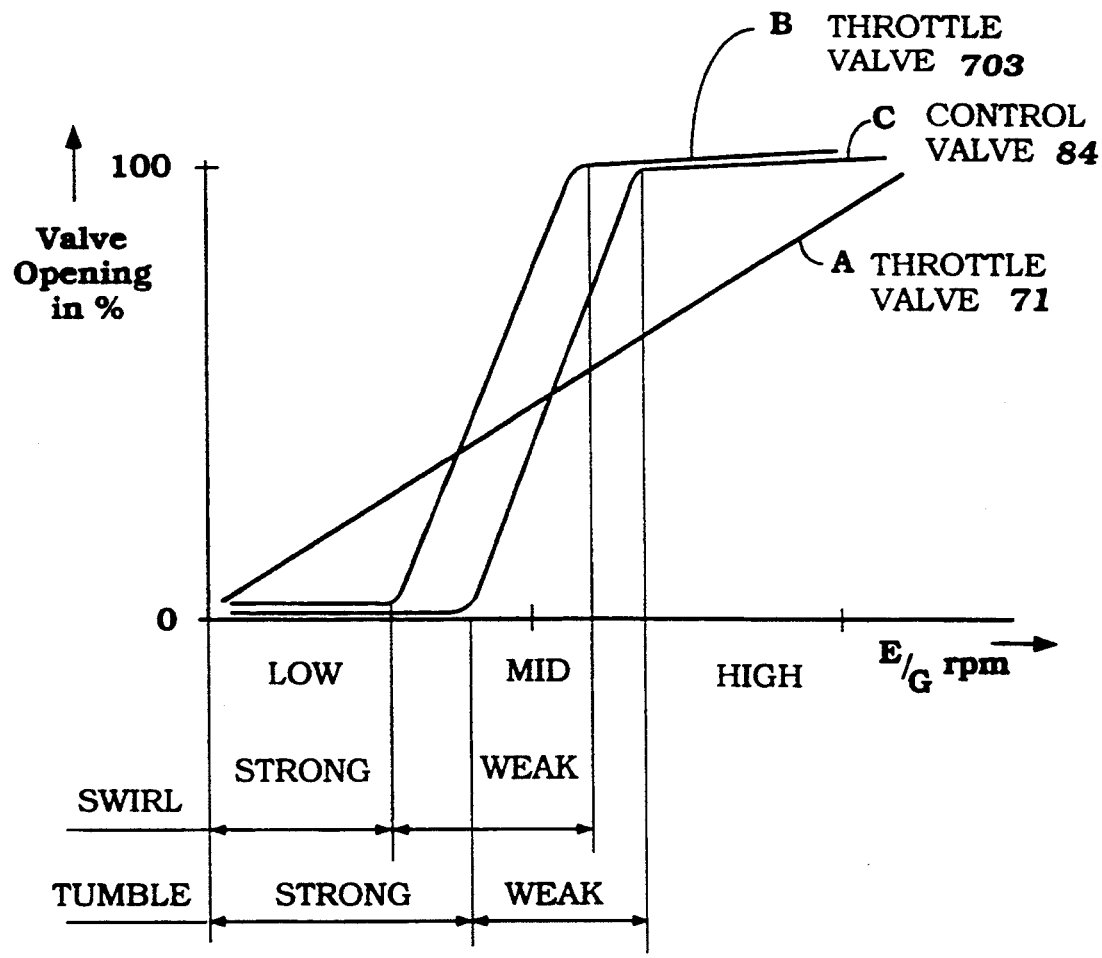
FIG. 43 is a graphical view of showing how the various valves are operated in conjunction with this embodiment in relation to valve opening and engine speed.

In the embodiment of the invention as thus far described, the control of the flow of air entering the combustion chamber of the engine has been effected primarily by a single control valve which may control one or both intake passages communicating with the respective cylinder. Total engine speed is controlled by a single throttle valve upstream of this control valve. Although this arrangement has great utility, further improvement in control of the flow and providing varying flow patterns may be achieved through the use of an additional control valve and FIGS. 41 through 43 show another embodiment using such an additional throttle valve. This arrangement may be employed with any of the types of constructions thus far described but since the embodiment of FIGS. 41 through 43 has most similarity to the embodiment of FIGS. 1 and 2, the reference numerals applied to the components in that figure have been applied to the components in this figure and will not be described again, except to show the relationship between these components and those added by way of this embodiment. However, this embodiment employs fuel injection as shown in the embodiment of FIG. 3 wherein a fuel injector 102 sprays only into the induction passage 64a. However, the invention can be employed with other types of charge forming systems, as will be readily apparent to those skilled in the art.

In this embodiment, a further throttle body 701 is interposed between the cylinder head intake ports openings 62 and the throttle body in which the throttle valve 71 are supported. The further throttle body 701 supports a throttle valve shaft 702 to which a pair of throttle valves having a configuration as best shown in FIG. 42 are fixed and which throttle valves are indicated generally by the reference numeral 703. The throttle valves 703 have cut out portions 704 so that they will offer no restriction in either position to the flow through the intake passages 64a. However, the non-cut out portions of the throttle valves 703 will obscure the flow through the intake passages 64b when the throttle valves 703 are in their fully closed position as shown in FIG. 42.

The control of the control valve 84 and the throttle valves 703 is done by means of a CPU, indicated schematically by the reference numeral 705. The CPU 705 receives an input indicative of engine speed, as provided by an engine speed sensor that cooperates with the engine crankshaft in a manner as previously described and input indicative of the position of the throttle valve 71. The CPU output signals to two stepper motors 706 and 707. The stepper motor 706 is connected by means of a connection indicated by the letter b to the control lever 88 of the control valve 84. The stepper motor 707 is connected by means of a connection indicated by the letter a to a lever 708 that is connected to the throttle valve shaft 702. The sequence of operation of opening and closing of the respective throttle valves may be understood by reference to FIG. 43.

FIG. 43 shows the relation of the valves 71, 84 and 703 between their fully closed position 0% and their fully opened position 100% in relation to engine speed. Also shown are the respective swirl and tumble conditions. As may be seen, the throttle valve 71 is opened in linear fashion and during initial opening of the throttle valve 71, as aforenoted, the control valve 84 and also, in this embodiment, the throttle valve 703 are maintained closed. While both valves are closed there is both strong swirl and strong tumble. As the engine speed increases, then, while still in the low range, the throttle valve 703 begins to open. As the throttle valve 703 begins to open, the swirl effect will be reduced while tumble will still be maintained strong.

Finely, a position is reached, before the throttle valve 703 is fully opened, wherein the control valve 84 has begun to open. When this occurs, the tumble will then be weakened and a period where weak tumble and weak swirl are both maintained will occur up through the mid-range performance until all valves are opened at which time there will be substantially no tumble or swirl. This may provide excellent performance throughout the entire engine speed and load ranges.

Figure 44:
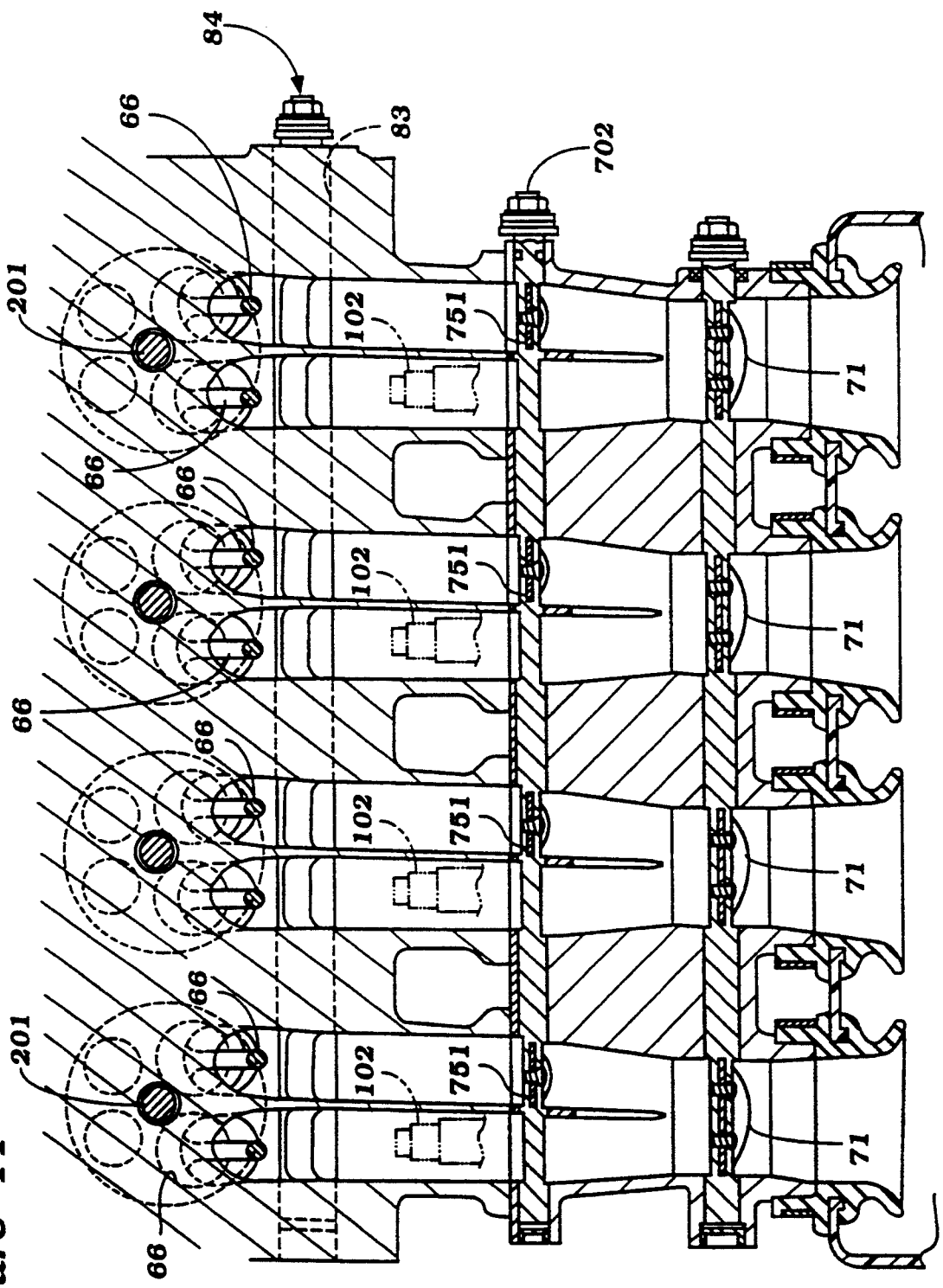
FIG. 44 is a cross sectional view in part similar to FIG. 41 and shows a still further embodiment of the invention.

FIG. 44 shows yet another embodiment of the invention, which is generally the same as the embodiment of FIGS. 40 through 43 and differs from that embodiment only in the fact that the added throttle valve in this embodiment only has a single valve plate 751 which cooperates to control the flow through the intake passages 64b. In this way, the restriction of flow through the passages 64a is very low under all conditions and hence even better volumetric efficiency can be achieved. In this embodiment, there are no separate valve bodies but it is to be understood that the invention can be employed in conjunction with arrangements wherein any type of valve body arrangement is incorporated.

It should be readily apparent from the foregoing description that the described embodiments of the invention are very effective in insuring good engine running under all conditions particularly at low and mid-range speeds by providing good turbulence in the combustion chamber. The type of turbulence achieved can be varied, as aforenoted.

In all of the embodiments of the invention described there have been provided two intake valves for each combustion chamber which have been served by siamesed passages. As should be apparent from the description, the invention can be utilized in conjunction with engines having a single intake port and valve and also may be employed with engines having more than two intake valves such as three valve engines. Also, the invention is not limited to the use with siamese intake passages but may be employed wherein there are separate intake passages for each intake valve.

It is, of course, to be understood that the foregoing description is that of preferred embodiments of the invention and that various changes and modifications may be made without departing from the spirit and scope of the invention, as defined by the appended claims.

I claim:

1. A porting arrangement for an internal combustion engine having a cylinder, a piston reciprocating within said cylinder, a cylinder head fixed to said cylinder, inlet port means for admitting a charge into said cylinder, and means cooperating with said inlet port means for selectively generating a circular swirl to a charge entering said cylinder from said inlet port means and a tumble motion to said charge around said cylinder between said cylinder head and a head of said piston.

2. A porting arrangement as set forth in claim 1 wherein the inlet port means is formed in the cylinder head.

3. A porting arrangement as set forth in claim 2 wherein the inlet port means comprises a pair of inlet ports opening into the cylinder from the cylinder head.

4. A porting arrangement as set forth in claim 3 further including inlet passage means formed in the cylinder head and serving the inlet ports.

5. A porting arrangement as set forth in claim 4 wherein the means for generating the swirl and tumble motion comprises a control valve.

6. A porting arrangement as set forth in claim 5 wherein the control valve controls the configuration of the inlet passage means.

7. A porting arrangement as set forth in claim 5 wherein the inlet passage means comprises a pair of passages each terminating at a respective one of the inlet ports.

8. A porting arrangement as set forth in claim 7 wherein the control valve controls the configuration of the inlet passage means.

9. A porting arrangement as set forth in claim 8 wherein the circular swirl is generated by changing the effective flow areas of the respective passages for generating a higher flow velocity through one of the passages than the other of the passages.

10. A porting arrangement as set forth in claim 8 wherein the tumble motion is generated by redirecting the flow through the passages in a direction generally across the cylinder bore.

11. A porting arrangement as set forth in claim 10 wherein the circular swirl is generated by changing the effective flow areas of the respective passages for generating a higher flow velocity through one of the passages than the other of the passages.

12. A porting arrangement as set forth in claim 5 wherein the control valve is moveable between a first position wherein the circular swirl and tumble motion are generated and a second position wherein a different flow pattern in the cylinder is generated.

13. A porting arrangement as set forth in claim 12 wherein the different flow pattern is generally along the axis of the cylinder.

14. A porting arrangement as set forth in claim 13 wherein the inlet passage means comprises a pair of passages each terminating at a respective one of the inlet ports.

15. A porting arrangement as set forth in claim 14 wherein the control valve controls the configuration of the inlet passage means.

16. A porting arrangement as set forth in claim 15 wherein the circular swirl is generated by changing the effective flow areas of the respective passages for generating a higher flow velocity through one of the passages than the other of the passages.

17. A porting arrangement as set forth in claim 15 wherein the tumble motion is generated by redirecting the flow through the passages in a direction generally across the cylinder bore.

18. A porting arrangement as set forth in claim 17 wherein the circular swirl is generated by changing the effective flow areas of the respective passages for generating a higher flow velocity through one of the passages than the other of the passages.

19. A porting arrangement as set forth in claim 5 wherein the inlet passage means comprise first and second portions meeting at a bight and wherein the control valve is positioned at the bight, the control valve being moveable between a first position wherein the tumble and swirl are generated and a second position wherein the control valve provides a smooth surface between the first and second portions and there is no flow redirection.

20. A porting arrangement as set forth in claim 19 wherein the inlet passage means comprises a pair of passages each terminating at a respective one of the inlet ports.

21. A porting arrangement as set forth in claim 20 wherein the control valve controls the configuration of the inlet passage means.

22. A porting arrangement as set forth in claim 21 wherein the circular swirl is generated by changing the effective flow areas of the respective passages for generating a higher flow velocity through one of the passages than the other of the passages.

23. A porting arrangement as set forth in claim 21 wherein the tumble motion is generated by redirecting the flow through the passages in a direction generally across the cylinder bore.

24. A porting arrangement as set forth in claim 23 wherein the circular swirl is generated by changing the effective flow areas of the respective passages for generating a higher flow velocity through one of the passages than the other of the passages.

25. A porting arrangement as set forth in claim 19 further including means for cooling the control valve.

26. A porting arrangement as set forth in claim 25 wherein the means for cooling the control valve comprises means for injecting fuel into the passage means to impinge upon the control valve.

27. A porting arrangement as set forth in claim 25 wherein the means for cooling the control valve comprises means for directing an air flow across the control valve.

28. A porting arrangement as set forth in claim 27 wherein the air flow is delivered through the control valve.

29. A porting arrangement as set forth in claim 28 wherein the air flow across the control valve is directed in a direction to add to the swirling motion.

30. A porting arrangement as set forth in claim 28 wherein the air flow occurs only when the control valve is in one of its positions.

31. A porting arrangement as set forth in claim 27 wherein the air flow is delivered through another port and is directed toward the control valve.

32. A porting arrangement as set forth in claim 31 wherein the other port is controlled by a valve.

33. A porting arrangement as set forth in claim 32 wherein the other valve is operative only in certain positions of the control valve.

34. A porting arrangement as set forth in claim 32 wherein the other valve comprises a portion of the control valve.

35. A porting arrangement as set forth in claim 34 wherein the other control valve portion is open only when the control valve is in one of its positions.

36. A porting arrangement as set forth in claim 25 wherein the means for cooling the control valve comprises a water jacket juxtaposed to the control valve.

37. A porting arrangement as set forth in claim 36 wherein the water jacket is formed around the cylinder and in a cylinder block forming the cylinder.

38. A porting arrangement as set forth in claim 36 wherein the water jacket is formed in the cylinder head.

39. A porting arrangement as set forth in claim 38 wherein a water jacket is also formed around the cylinder and in a cylinder block forming the cylinder.

40. A porting arrangement as set forth in claim 8 wherein the cylinder is formed by a cylinder block to which the cylinder head is affixed by first threaded fastening means on one side of the cylinder block and adjacent the control valve and second threaded fastening means formed on the other side of the cylinder, the first threaded fastening means being positioned further from the bore of the cylinder than the second threaded fastening means.

41. A porting arrangement as set forth in claim 40 further including exhaust port means formed in the cylinder head on the opposite side from the inlet port means, intake valve means for controlling the inlet port means and exhaust valve means for controlling the exhaust port means, an intake camshaft supported for rotation about a first axis for operating said intake valve means, an exhaust camshaft supported for rotation about a second axis by said cylinder head for operating said exhaust valve means, said inlet camshaft axis being disposed further from the axis of the cylinder than the exhaust camshaft axis.

42. A porting arrangement as set forth in claim 8 further including an exhaust port means formed in the cylinder head on the opposite side from the inlet port means, intake valve means for controlling the inlet port means and exhaust valve means for controlling the exhaust port means, an intake camshaft supported for rotation about a first axis for operating said intake valve means, an exhaust camshaft supported for rotation about a second axis by said cylinder head for operating said exhaust valve means, said intake camshaft axis being disposed further from the axis of the cylinder than the exhaust camshaft axis.

43. A porting arrangement for an internal combustion engine having a cylinder, a piston reciprocating within said cylinder, a cylinder head fixed to said cylinder, inlet port means for admitting a charge to said cylinder, and means cooperating with said inlet port means for selectively generating either a circular swirl to a charge entering said cylinder from said inlet port means or a tumble motion to said charge around said cylinder between said cylinder head and a head of said piston.

44. A porting arrangement as set forth in claim 43 wherein the inlet port means is formed in the cylinder head.

45. A porting arrangement as set forth in claim 44 wherein the inlet port means comprises a pair of inlet ports opening into the cylinder from the cylinder head.

46. A porting arrangement as set forth in claim 45 further including inlet passage means formed in the cylinder head and serving the inlet ports.

47. A porting arrangement as set forth in claim 46 wherein the means for generating the swirl and tumble motion comprises a control valve.

48. A porting arrangement as set forth in claim 47 wherein the control valve controls the configuration of the inlet passage means.

49. A porting arrangement as set forth in claim 47 wherein the passage means comprises a pair of passages each terminating at a respective one of the inlet ports.

50. A porting arrangement as set forth in claim 49 wherein the control valve controls the configuration of the inlet passage means.

51. A porting arrangement as set forth in claim 50 wherein the tumble motion is generated by redirecting the flow through the passages in a direction generally across the cylinder bore.

52. A porting arrangement as set forth in claim 50 wherein the swirl is generated by delivering an air charge into one of the intake passages for accelerating the velocity of the air flow through said one intake passage.

53. A porting arrangement as set forth in claim 52 wherein the air charge is controlled by a valve.

54. A porting arrangement as set forth in claim 53 wherein the valve controlling the air flow comprises another portion of the control valve.

55. A porting arrangement as set forth in claim 52 wherein the air charge is delivered from an induction system for the engine.

56. A porting arrangement as set forth in claim 55 wherein the engine includes at least one additional cylinder and the air charge is delivered from the induction system serving that other cylinder.

57. A porting arrangement as set forth in claim 55 wherein the induction system has an atmospheric air inlet and the air charge is delivered from the atmospheric air inlet of the induction system.

58. A porting arrangement as set forth in claim 57 further including a throttle valve for controlling the flow through the atmospheric air inlet.

59. A porting arrangement as set forth in claim 58 wherein the air charge is derived upstream of the throttle valve.

60. A porting arrangement as set forth in claim 58 wherein the air charge is derived downstream of the throttle valve.

61. A porting arrangement engine having a cylinder, as set forth in claim 55 wherein the air charge is controlled by a valve.

62. A porting arrangement as set forth in claim 61 wherein the valve controlling the air flow comprises another portion of the control valve.

* * * * *